United States Patent [19]
Shriver

[11] Patent Number: 5,981,883
[45] Date of Patent: Nov. 9, 1999

[54] SYSTEMS FOR IMAGING WRITTEN INFORMATION

[75] Inventor: Stefaan A. Shriver, Newton, Mass.

[73] Assignee: LCI Technology Group, N.V., Netherlands

[21] Appl. No.: 08/699,258

[22] Filed: Aug. 19, 1996

Related U.S. Application Data

[63] Continuation-in-part of application No. 08/339,134, Nov. 14, 1994, Pat. No. 5,548,092, which is a continuation-in-part of application No. 07/910,650, Jul. 8, 1992, abandoned.

[51] Int. Cl.⁶ .................................................. G08C 21/00
[52] U.S. Cl. .......................................................... 178/18.01
[58] Field of Search .................................... 345/174, 177, 345/179; 73/708, 726, 862.04, 862.05, 862.06; 178/18.01, 18.03

[56] References Cited

U.S. PATENT DOCUMENTS

| | | | |
|---|---|---|---|
| 3,915,015 | 10/1975 | Crane et al. | 73/432 |
| 4,116,075 | 9/1978 | Ort | 73/708 |
| 4,751,741 | 6/1988 | Mochinaga et al. | 382/13 |
| 4,896,543 | 1/1990 | Gullman | 73/862.04 |

FOREIGN PATENT DOCUMENTS

WO 94/01834  1/1994  WIPO.

*Primary Examiner*—Vijay Shankar
*Attorney, Agent, or Firm*—Foley, Hoag & Eliot LLP

[57] ABSTRACT

An image processing apparatus functioning as a writing device that images information as it is written on to a surface by measuring the forces applied at the stylus tip. The imaging device includes a ink pen cartridge and strain gauges mounted along the longitudinal axis of the cartridge. The strain gauges measure lateral forces deflecting the pen cartridge, and the longitudinal forces pressing the cartridge into the pen housing. Alternatively, strain gauges can also determine the force of the pen tip against the writing surface. The gauges generate signals representative of the forces applied to the pen point as the pen moves along or presses against a writing surface. A further set of sensors can be employed to determine movement and orientation of the device relative to the surface even when the pen is not in contact with the surface. Data representative of the written images are captured by analyzing the forces applied to the pen point.

16 Claims, 12 Drawing Sheets

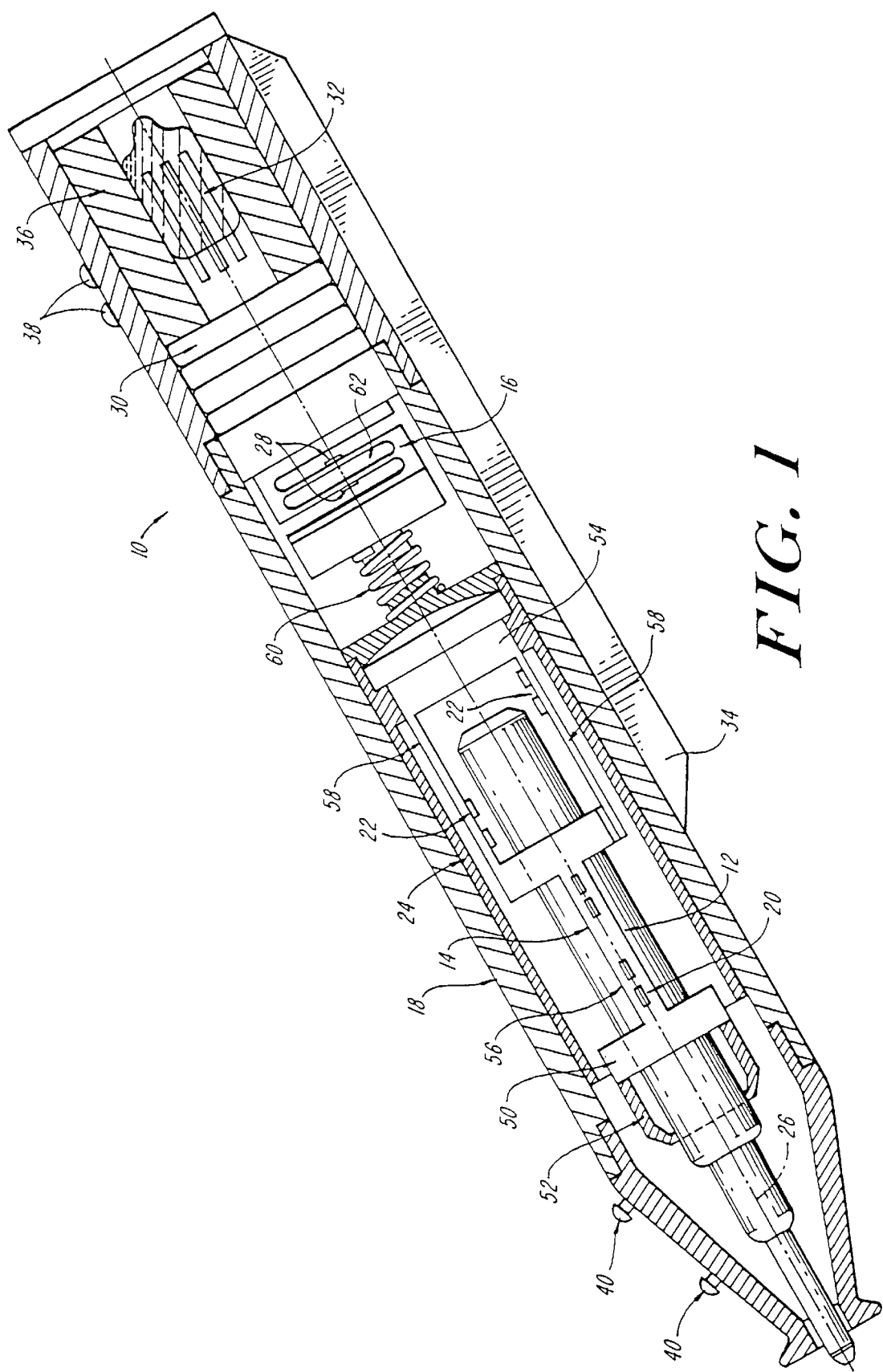

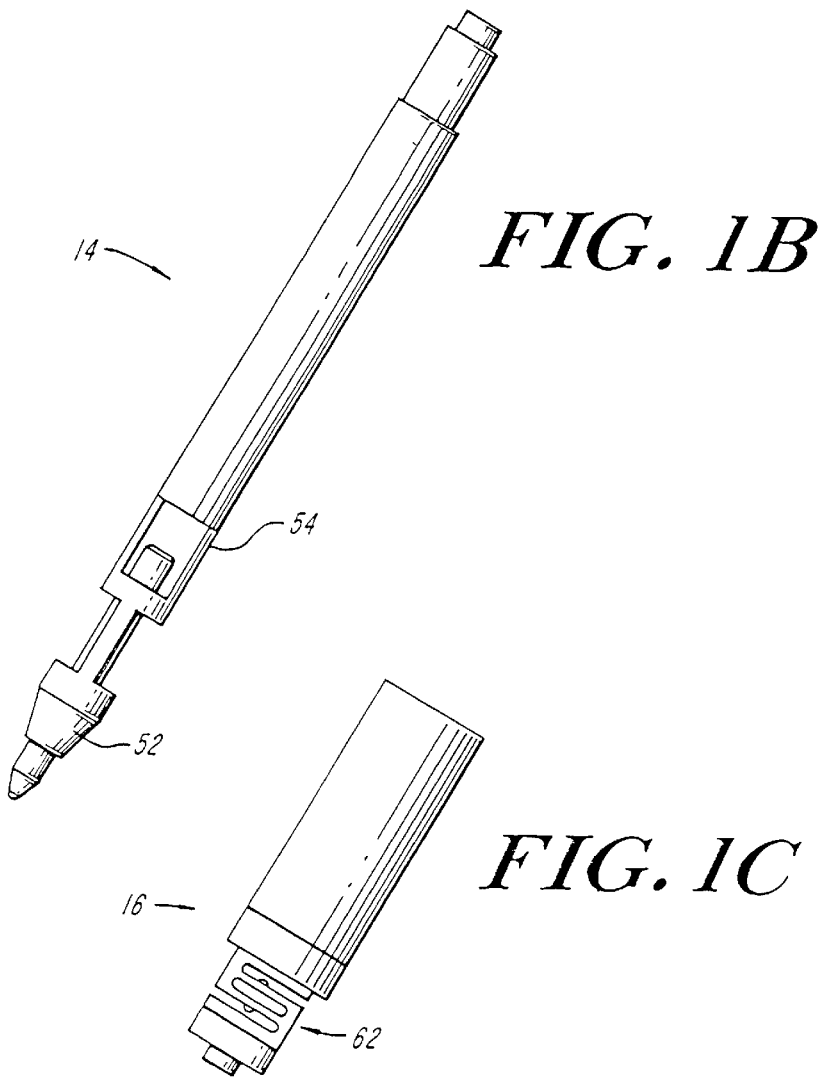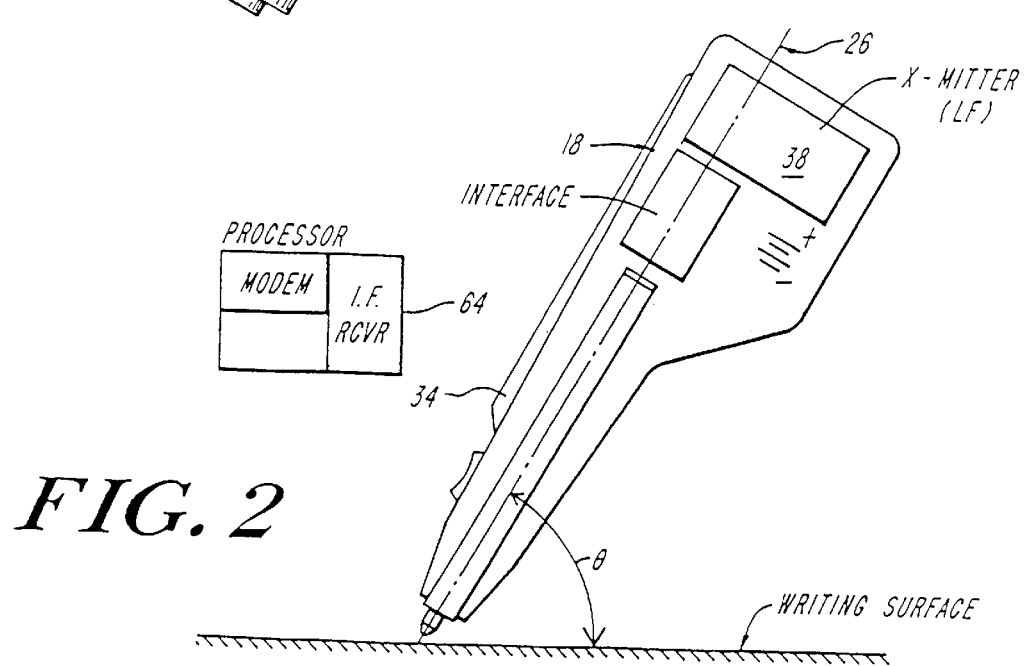

SYSTEMS FOR IMAGING WRITTEN INFORMATION

REFERENCE TO RELATED APPLICATION

This application is a continuation in part application of pending U.S. patent application Ser. No. 08/339,134, filed Nov. 14, 1994, now U.S. Pat. No. 5,548,092 entitled Apparatus and Method of Imaging Written Information, the teachings of which are herein incorporated by reference, and which in turn is a continuation-in-part of U.S. Ser. No. 07/910,650, filed Jul. 8, 1992, now abandoned.

BACKGROUND OF THE INVENTION

This invention generally relates to the field of image processing and in particular to devices for capturing image data information as it is written on a surface.

Various systems have been proposed in the past for capturing image information as the information is written. Such systems typically detect forces that describe the pattern being traced out on a surface. These forces can be used to recreate the written image. How accurately written images can be recreated depends on how completely the forces describe the motion of the device against the surface. For example, forces acting on more than one axis of a pen point may represent that the pen point is moving along a writing surface, or may represent that the pen is being held at an angle on a stationary point. Without more information an accurate image cannot be obtained. The ability to image written information, therefore, is limited by the information concerning pen position and orientation.

For a device to accurately image information as it is written, data concerning the device's position on the writing surface, orientation to the writing surface and movement along the writing surface must be gathered.

In general, devices for imaging information as it is written gather information concerning movement by detecting the mechanical forces at the device's point while the point is in contact with the writing surface. In order to gather reasonably accurate information, imaging devices have typically employed special pen point cartridges for sensing mechanical forces. In many cases these pen point housings exhibit nonlinear behavior, i.e. elastic compression, thereby corrupting the sensed data. Furthermore, these housings are costly and too fragile for a typical work environment.

In order to correctly process the forces sensed at a pen point, the orientation of the device to the surface must be known. For example, the device's ability to distinguish between forces caused by the pen point being held at an angle at a stationary spot and forces caused by the pen point being moved along a surface, cannot be resolved unless the orientation of the device is known. Devices for imaging written information have typically required that the pen point be held at a specific angle, usually perpendicular to the writing surface. While this method allows an accurate assessment of the forces when the pen point is held correctly, its accuracy falls off with slight variations of orientation and is therefore often impractical for the ordinary work environment.

Another consideration for imaging written information is the need to accurately position new images relative to prior images. Once a pen has been lifted from a writing surface its position relative to its prior location on the writing surface is unknown. Devices for imaging written information have typically required a special surface capable of detecting a pen point. While this method gathers pen point position data, it burdens the use of imaging devices and at the same time substantially increases cost.

It is, therefore, an object of the present invention to provide an imaging apparatus affording accurate representation of information as it is written on a surface.

It is another object of the present invention to provide such a device that operates accurately at the typical angular orientations of a conventional writing stylus.

It is a further object of the present invention to provide such a device that maintains absolute pen point position on a writing surface.

Further objects of the present invention will be apparent from the following detailed description.

SUMMARY OF THE INVENTION

Image processing devices for imaging written information are disclosed in which a pen cartridge, a movement sensing means and a contact sensing means cooperate to determine the forces applied to the tip of the pen cartridge as the pen cartridge writes information on a surface. In one embodiment the pen cartridge, movement sensing means and contact sensing means are axially aligned in a housing, and an electronic coupling means transmits the generated image data to an apparatus for further processing. A tilt sensor element can be mounted to the housing for measuring the orientation of the pen relative to a writing surface.

Through the use of a pen cartridge, movement sensor and contact sensor, accurate information concerning the motion of the pen point can be obtained from devices held at natural angles. By determining forces along the longitudinal axis of the pen cartridge, forces indicative of pen motion can be distinguished from forces indicative of pen contact at a point on a surface. Because the device can be held at typical writing angles, there is no need for specially manufactured pen cartridges that maintain a known orientation from the surface.

Additionally, by using conventional ink pen cartridges, the device thereby achieves substantial economy in manufacture. The use of conventional ink cartridges allows the device to choose from a selection of robust and proven writing styluses, thereby creating an instrument well suited for the work environment.

In one embodiment, the stylus element is a conventional ink pen cartridge that is slid inside the movement sensing means which provides a rigid harness with mounted strain gauges. A second rigid body having mounted strain gauges, the contact sensing means, is positioned behind the first rigid harness. As the user writes, the pen cartridge bends and deforms the first rigid harness causing the mounted strain gauges to generate signals describing the lateral forces at the pen tip. The longitudinal forces acting at the pen tip compress and deform the second rigid body positioned behind the harness causing the mounted strain gauges to generate signals describing the longitudinal forces.

These image signals that represent the forces acting on the pen tip are transmitted to a data processing unit that processes the signals according to a known method to recreate an electronic image of the text and graphics written on the writing surface.

The invention can further be understood as apparatus for measuring an applied force that comprises a substrate having an upper surface, a lower surface, a peripheral portion, and a plurality of cutouts disposed between the upper and lower surfaces and spaced inwardly from the peripheral to form a deflecting portion disposed inward from the cutouts, and to form a plurality of arms that connect between the deflecting portion and the peripheral portion. In one preferred embodiment, the plurality of cutouts includes four cutouts and four arms. Further, the arms extend readily outward from the deflecting portion of the sensor and extend relative to a set of transverse axes. In a further preferred alternative embodiment, there are three cutouts and three arms of the sensor.

The sensors can further include transducers that are mounted to the plurality of arms to generate deflection signals representative of the deflection of the deflecting portion responsive to an implied force acting on the deflecting portion. Typically, the transducers are strain gauges, but can be any type of transducers suitable for generating a signal that is representative of the deflection of the deflection portion.

In a further preferred embodiment, the sensors further include a circuit that electrically connects to the transducers for generating responsive to the deflection signal a force signal representative of the applied force. In an optional but preferred embodiment, the sensors also include a temperature compensator circuit for detecting a temperature characteristic. The temperature compensator can couple to the circuit for directing the circuit to generate the force signal responsive to the temperature characteristic. In this way, a temperature compensator is employed to compensate for strains measured by transducers and caused by thermal expansion or contraction of the substrate body.

The substrate typically includes a silicon substrate or a metallic substrate. In the case of a metallic substrate, preferably, there is a ceramic coating on one of the surfaces of the substrate which typically is aluminum oxide.

At a further aspect, the invention can be understood as processes for manufacturing a sensor for measuring an applied force. These processes can comprise the steps of providing a substrate body having a peripheral portion, an upper surface and a lower surface, and forming within the substrate body, a plurality of cutouts that extend between the upper and lower surfaces and that are spaced inwardly from the peripheral portion to form a deflecting portion and a plurality of arms that connect between the deflecting portion and the peripheral portion. In a preferred embodiment of the invention, these processes include the step of milling a silicon wafer in order to provide the substrate body. The step of milling can include the step of directing a laser beam at the silicon wafer, or directing an ion beam at the silicon wafer, or any other milling step suitable for cutting a substrate body from a silicon or metallic wafer.

Processes according to the invention can also include the step of milling the substrate material to have a select pattern for the peripheral portion. Accordingly, processes according to the invention can form sensors that have irregular geometrys to provide sensors that more easily fit within the housing of a pen assembly, or any other type of assembly.

In a further aspect of the invention, demarcation signals and control signals can be inserted into the imaged data to differentiate between groups of 'images and control the processing of imaged signals. By adding activation switches to the electronic coupling devices the imaged data can be categorized or partitioned as it is being written, thereby eliminating a later step of processing.

In yet another aspect of the invention, two units constructed in accordance with the present invention image written information at two distinct and remote locations. The image signals are transmitted to a common data processing location so that one composite image is created from the two signals.

These and other advantages of the present invention will be more clearly understood by reference to the following detailed description in conjunction with the attached drawings in which like reference numbers refer to like elements.

The invention will next be described in connection with certain illustrated embodiments. However, it should be clear that various additions, subtractions and modifications can be made without departing from the spirit or scope of the invention. For example, although the invention is principally described in connection with pens and markers, any writing instrument or, more generally, any imaging or drafting device can employ the teachings of the present invention to capture image information. Moreover, the invention can be used not only with traditional writing surfaces such as pads of paper but any surface where frictional forces can be measured including, for example, blackboards, computer monitor screens and other visual display media.

BRIEF DESCRIPTION OF THE DRAWINGS

FIG. 1 is a schematic representation of an electronic imaging apparatus constructed in accordance with the present invention;

FIG. 1B is a more detailed illustration of an inner housing component of a movement sensing means for use in the apparatus of FIG. 1;

FIG. 1C is a more detailed illustration of a contact sensor for use in the apparatus of FIG. 1;

FIG. 2 is a view of the present invention disposed relative to a writing surface;

DETAILED DESCRIPTION

Figure 1A:
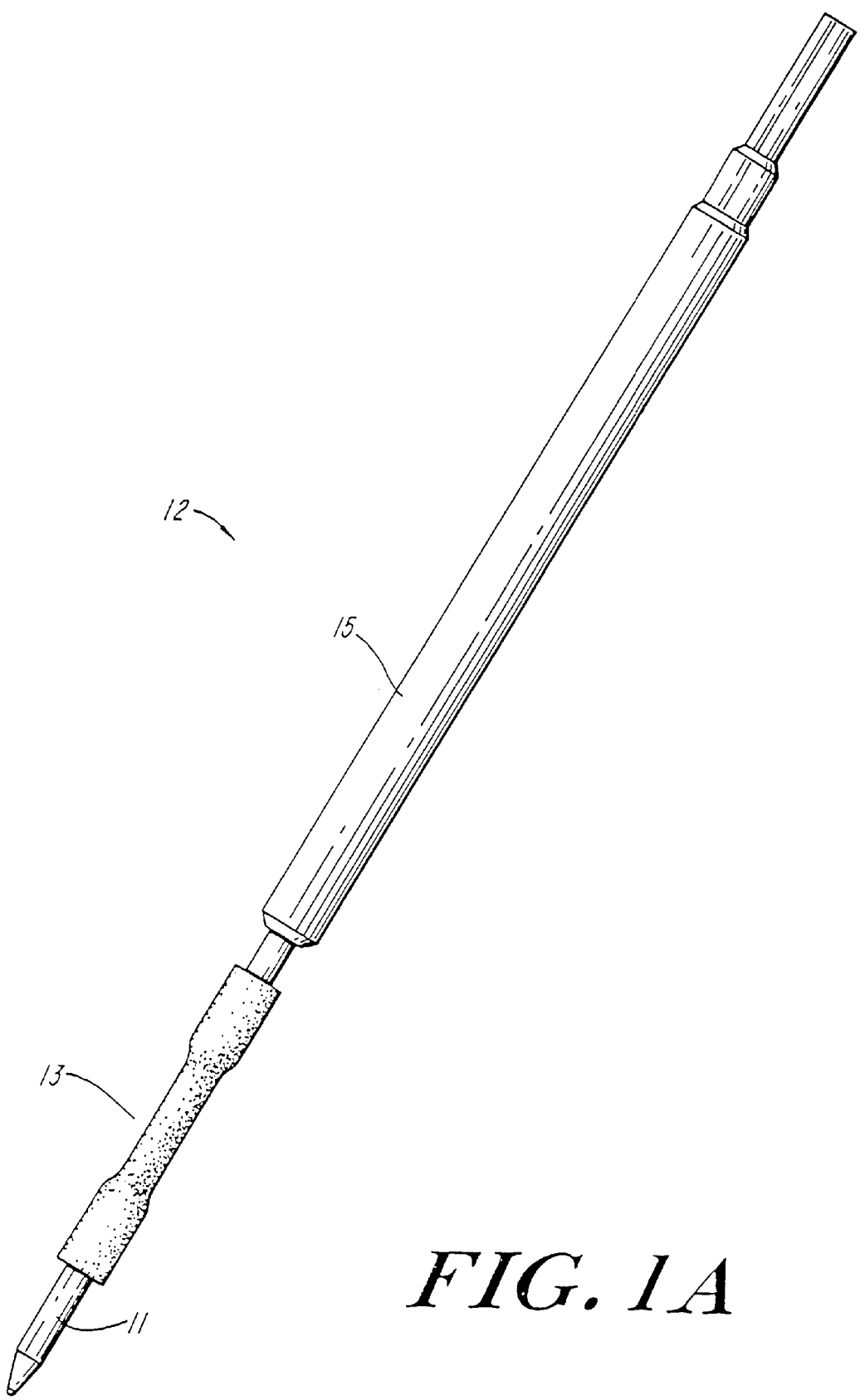
FIG. 1A is a more detailed illustration of a stylus for use in the apparatus of FIG. 1.

In FIG. 1, a system 10, according to the present invention, is shown, including a stylus element 12, a movement sensing means 14 and a contact sensing means 16, all of which are disposed within a housing 18. Through the use of these subunits, signals are generated that represent the three dimensional forces describing the movement of a stylus tip as it traces a pattern on a surface.

In the present invention as depicted in the embodiment illustrated in FIG. 1, the horizontal and vertical force sensing capability of the movement sensing means 14 and the longitudinal force sensing capability of the contact sensing means 16, combine to create a description of the forces acting on the tip of stylus element 12. In the embodiment shown, the stylus element 12, movement sensing means 14 and contact sensing means 16 are aligned in housing means 18. It is further shown that the stylus element 12 is seated within the movement sensing 14, having its distal end extending from the housing means 18, and the contact sensing means 16 is disposed rearward and separate from where the movement sensing means 14 is connected to the housing 18.

As shown in FIG. 1, the distal tip of the stylus element 12 is capable of making contact with a writing surface for tracing patterns such as writing numerals or geometric figures. As the tip of the stylus 12 is moved across the writing surface to trace this figure, the stylus element 12 behaves like a moment arm. FIG. 1A provides another view of a stylus element 12 separated from the rest of the system 10. As shown in FIG. 1A, the stylus 12 includes a tip 11, an ink reservoir 15 and a flexible nib 13 for transporting ink from reservoir 15 to tip 11. The stylus element 12 transmits the horizontal and vertical forces acting on the tip of the stylus element 12 to the points where the movement sensing means 14 connect to the housing 18. The flexible nib 13 of FIGS. 1 and 1A, serves to decouple the ink cartridge 15 from the movement sensing means. The movement sensing means 14 bends and deflects according to the moment resulting from the forces on the stylus tip."For the embodiment shown in FIG. 1, two pairs of transducers 20 and 22 generate signals proportional to the deflection of the movement sensing means 14.

As further shown in the embodiment of the invention depicted in FIG. 1, the movement means 14 is seated within an axially slidable inner housing 24. In this way, as the stylus element 12 presses against the writing surface, the movement sensing means 14 slides along the longitudinal axis 26 of the stylus element 12 and axially compresses the contact sensing means 16 in proportion to the force acting along the longitudinal axis 26. Transducers 28, mounted to the contact sensing means 16 generate signals proportional to the force compressing the contact sensing means 16.

As further shown in the embodiment of the invention depicted in FIG. 1, a power source 30, such as a battery, is placed rearward of the contact sensing means 16. The power source 30 supplies power to the transducer elements and to the tilt switch 32 and computer interface 36. The tilt switch sensor 32 is connected rearward of the power source 30.

The tilt sensor 32 illustrated in FIG. 1, is of a type well known in the art for determining the angle of orientation from a level plane. In FIG. 1 the tilt sensor 32 is aligned along, or parallel with, the longitudinal axis 26. The orientation of the stylus element 12 to the writing surface is monitored while patterns are traced on the writing surface. The tilt sensor 32 produces signals indicative of orientation from a level plane by using a conductive electrolyte fluid surrounding a plurality of electrical conductors. The conductive fluid maintains a constant level within sensor 32. As the angles between longitudinal axis 26 and the surface changes, the conductive paths between the electrical contacts changes. The different electric paths formed indicate different angles of orientation between the writing surface and the stylus element 12.

To ensure accurate measurements of tilt over time, it is preferable that the outer surface of the outer housing 18 include an asymmetric surface such as the ridge 34 shown in FIG. 1 to prevent the user from twirling the device 10 in his or her hand during usage. Similarly the inner and outer housing, 24 and 18, should be linked by a sliding grove or the like to prevent rotation of one vis-à-vis the other.

Additionally, in the embodiment of FIG. 1 an infrared or similar wireless data link establishes a communication path to an external processor, such as a microcomputer, for processing of the image signals representative of the patterns traced on the writing surface. As further illustrated in FIG. 1, one or more activation switches 40 can be disposed at the forward end of the outer housing 18, in order to generate control signals representative of information concerning the operating status of the system 10. These signals can be communicated along with image data to a data processor.

In use the device 10 is employed in conjunction with a data processing unit 64, as shown schematically in FIG. 2 to provide a facsimile reconstruction of the written information. The movement sensor means 14 establishes a fixed system of coordinates associated with the device 16. Spinning the device around its longitudinal axis 26 offsets the coordinate system of the device from an established absolute coordinate system. The effect is that the x-y axes of the device do not coincide with the x-y axes of the writing surface, nor of the x-y axes of any video display of the recreated images. As will be explained in greater detail hereinafter, the coordinate systems can be referenced to an absolute, coordinate system by an initiation sequence.

The data processing unit processes the image signals through a bitmap algorithm. Bitmap algorithms, known in the art of facsimile reproduction, map points on the writing surface to points on a reference surface. Position information within the image signals is translated by a mapping table on to the reference surface. Bitmapping provides scalable reconstruction of the written images and maps the image signals into the coordinate system of the absolute reference coordinate system. In a further embodiment, the processing unit processes the image signals with an algorithm that uses strokes of the stylus. The algorithm measures the time and rate of stylus tip acceleration and recreates electronic images of the written information. In yet a further embodiment, the processor unit processes the image signals through a spline algorithm as known in the art.

In the present invention, movement sensing means 14 and contact sensing means 16 convert mechanical distortions into electrical signals representative of the three dimensional forces acting on the forward tip of the stylus element 12. The generation of these electrical signals is accomplished by transducers that have an electrical characteristic that changes responsive to mechanical forces. In one embodiment of the invention, a Wheatstone bridge having strain gauge resistors in the current paths is constructed so that the magnitude of the mechanical Strain acting on the gauges makes a corresponding change in the electrical resistance of the strain gauge. It should be appreciated that similar transducer mechanisms well known in the art, such as Hall effect transducers, piezoelectric transducers or optical attenuation sensors, that similarly function to transform the mechanical forces into electrical signals, can be used in the present invention.

FIG. 1 illustrates one embodiment of a movement sensing means 22 constructed in accord with the invention. The illustrated embodiment is a rigid support frame 50 constructed and dimensioned for axially receiving the stylus element 12. The stylus element 12 is axially slid into the support frame 50 and frictional engaged by the forward pinchers 52. The forward pinchers 52 and rearward pinchers 54 are connected by two pairs of transducer beams 56. The first set of transducer beams and the second set of transducer beams are orthogonally disposed to each other about the stylus 10. FIG. 1B provides another view of an inner housing 14 and a movement sensing means 22 separated from the rest of the system ID. Two transducer elements 20 are used to measure forces in each direction. The first pair of these transducer elements, illustrated in FIG. 1, housing 14 mounted to the forward end of the housing 14 and the second pair mounted to the rearward end. Improved sensitivity to mechanical deflections is provided by using two pair of transducers positioned in this way. Improved sensitivity and improved linear response is obtained by using a rigid support frame and rigid transducer beams, thereby reducing the absorption of forces acting on the stylus tip. Further improved sensitivity is obtained by axially aligning the transducer elements along the axis of the stylus element. Axially mounting of the transducer improves resistance to strain caused by the different thermal expansion of the different materials.

In the illustrated embodiment, the second pair of transducer beams is orthogonally displaced from the first set of transducer beams. In this way, forces acting on the movement sensor are resolved into vector forces acting along two independent axes. Moments are generated from the forces acting on the tip of the stylus element 12 by fixing the rearward end of the movement sensor to the inner housing 24 and allowing the movement sensor transducer beams to flex over their full length. The stylus element 12 seated in the pinchers then forms a moment arm for transmitting forces from the tip of the stylus. In the device these moments are converted into forces, and the forces are converted into signals representative of the pattern, traced by the stylus.

As shown schematically in FIG. 1, the movement sensor and the inner housing 24 are free to axially slide within an outer housing 18. In this way, forces acting on the longitudinal axis 26 are transmitted to the contact sensing means 16. In an apparatus constructed in accordance with the invention, as depicted by the embodiment illustrated in FIG. 1, these longitudinal forces are sensed by a contact sensing means 16 independent from the movement sensing means 14. With this construction the forces detected by the movement sensors can be processed independently from the forces detected by the contact sensor 16.

As further illustrated in FIG. 1, the contact sensing means can be separated from the slidable inner housing 24 by a spring 60. As illustrated, the contact sensor means includes a beam 62 with transducer elements 28 mounted on each side thereof. The spring can force the inner housing 24 and movement sensor to the forward end of the outer housing 18 so that the tip of the stylus extends out of the housing, if desired. In addition, the spring 60 serves to protect the contact means 16 from damage if, for example, the device is dropped on its tip. FIG. 1C illustrates the contact sensor 16 separated from the system 10. As shown, the contact sensor has a hollow central transducer beam 62 which permit a transducer element to be mounted to each side of the beam. Distortions of the transducer beam produce corresponding changes in an electrical property of the transducer. These changes are used to generate signals representative of the force applied along the longitudinal axis 26.

As noted above, the outer housing 18 can include ridge 34. The ridge 34 serves to maintain a relatively constant orientation of the device 10 in relation to the surface, by inhibiting the rotation of the device within the grip of the user. In this way, an absolute coordinate system can be established that has a relationship to the coordinate system of the writing surface.

To further establish a reference system, the device 10 can be calibrated or initialized by mapping the coordinate system of the actual writing environment onto an absolute coordinate system. In one example, the user performs an initiation sequence that aligns the horizontal and vertical axes of the writing surface to the horizontal and vertical axes of an absolute reference plane by drawing a horizontal line, a vertical line and a circle. The horizontal and vertical lines drawn on the writing surface coordinate the horizontal and vertical axes of the two planes respectively. The mapping information gathered from drawing a circle serves to further map the writing coordinate system into the absolute reference system.

As shown in FIG. 2, during the coordination of the two reference systems, the stylus is disposed at a natural orientation for writing. The stylus presses against the writing surface with a force indicative of writing. The longitudinal sensor determines the resultant force transmitted along the longitudinal axis 26. The resultant force vector yields the angle r between the writing surface and the stylus.

The longitudinal force is resolved into forces perpendicular to the writing surface, forces along the horizontal axis and forces along the vertical axis of the writing surface. The horizontal and vertical component forces resulting from the angular orientation of the stylus pressing against the writing surface are removed from the forces detected by the movement sensor. In this way, accurate force measurements along the horizontal and vertical axes are obtained. In the embodiment of the invention illustrated in FIG. 2, these signals are transmitted by infrared transmitter data link 38 to the processor unit 64.

Referring again to FIG. 1, the force along the longitudinal axis 26 controls the telescoping of the inner housing 24 within the outer housing 18 Furthermore, the longitudinal force detected by the contact sensing means 16 and resolved into component vector forces is used to determine the perpendicular force of the stylus 12 against the writing surface that is indicative of writing. If the longitudinal force along axis 26 is insufficient to compress the spring 60 and place the inner housing 24 against the contact sensing means 16 the longitudinal force is insufficient to indicate a force representative of writing. For the embodiment illustrated in FIG. 1, the stylus element 12 and movement sensing means are extended to the writing surface when the spring is not compressed. Contact with the writing surface is maintained to monitor the stylus position on the writing surface. By maintaining the stylus position on the writing surface the relative positions of written images can be maintained.

The present invention can image printed text because the position of one printed letter is maintained relative to the second printed letter. The user applies sufficient pressure against the writing surface to compress spring 60 and distort the contact sensing means 16 while writing the first letter. After writing the first letter, the user stops exerting force against the writing surface and the spring 60 slides the inner housing 24 to the writing surface to maintain contact. As the stylus 12 is moved across the surface to the position for the second printed letter, the movement sensor 14 detects the horizontal and vertical forces and discerns the position of the second letter relative to the first. In this way, the signal generated by the contact sensing means 16 encodes information concerning the printed image that allows a se s signal to be generated which is an accurate representation of the printed image.

In operation an ink viscosity can be selected so that ink will not flow from the stylus 12 until a specific force is exerted on the stylus 12. In this way, movement of the stylus 12 across the writing surface will not mark the writing surface when the perpendicular force is below the ink-flow threshold force. It should be apparent from the above description that the stylus element 12 can be any conventional ink cartridge or a pressurized ink cartridge with a known ink-flow threshold force.

In an alternative embodiment of the invention, the relative position of traced images is maintained by using an optical transducer, such as a light emitting diode or any such transducer well known in the art, to extend a beam of radiant energy to the writing surface and thereby detect the position of the stylus element 12 relative to demarcation lines drawn on the writing surface.

In an further aspect of the invention, the relative position of traced images can be determined even when the device 10 is lifted from the writing surface. In essence, the stylus 12 and/or inner housing 24 forms a moment arm from which one can measure the forces of acceleration as the device 10 is moved above the writing surface by measuring the relative motion of the inner and outer housing elements, 24 and 18. With reference again to FIG. 1, it should be appreciated that the stylus 12 and inner housing 24 of the movement sensing means 14, are rigidly joined at a collar of the support frame 50 so that the body of the housing 24 will flex about this point 50 when the instrument 10 is lifted off the writing surface and moved. The sensors 20 and 22 (or auxiliary sensors) can then measure accelerations and calculate the new location of the device when it is subsequently returned to the surface. The acceleration forces on the telescoping housing can be processed according to known navigation functions and algorithms to determine the position of the stylus tip relative to the writing surface.

As described above, the angle between the stylus element 12 and the writing surface determines the magnitude of the horizontal and vertical force components caused by the longitudinal force. In the embodiment depicted in FIG. 1, the tilt sensor 32 determines changes in the angle of orientation to adjust the horizontal and vertical forces representing the image traced on the writing surface.

Figure 3:
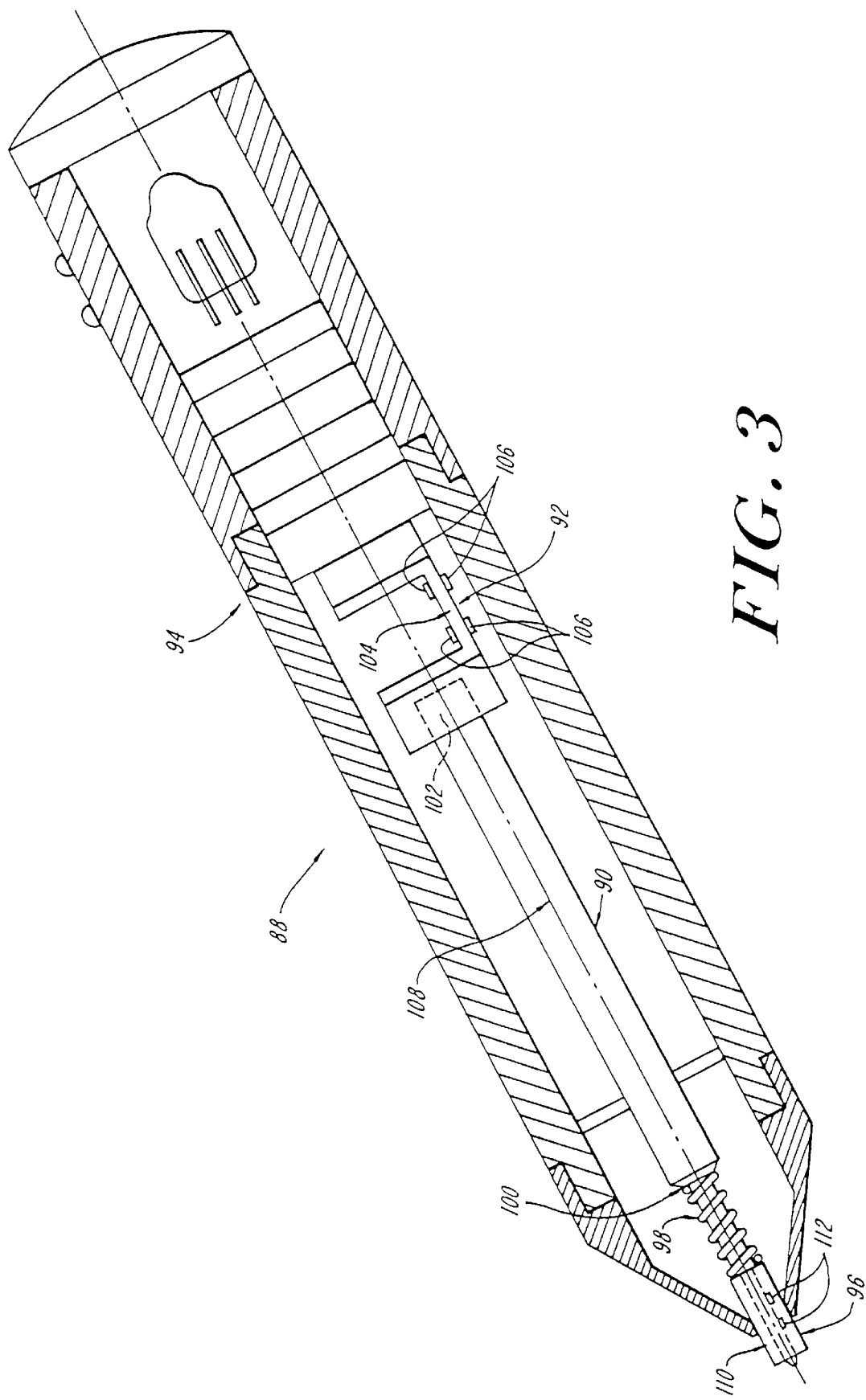
FIG. 3 is a schematic representation of an alternative embodiment of the present invention having a telescoping member.

FIG. 3 illustrates an alternative embodiment of the present invention. As depicted in FIG. 3, the device 88 has a stylus element 90 that is axially slid inside a contact sensing means 92. The rearward end of the contact sensing means 92 is fixed to the housing 94. A movement sensing means 96 is axially disposed over the forward tip of the stylus element 90 and a spring 98 is positioned between the movement sensing means and abutment 100 of the stylus element 90.

The movement sensing means 96 and stylus element 90 act as a moment arm for transmitting forces to the rearward end of the contact sensing means. The contact sensing means has a seat 102 for receiving the stylus element 90. The seat is connected to a transducer beam 104, extending rearward to the end connection with the housing. Two pairs of transducer elements 106 are mounted to each side of the transducer beam 104 and axially aligned with the longitudinal axis 108. Longitudinal forces acting on the contact sensing means 92 distort the transducer beam and alter an electrical property of the transducer element in relation to the distortion of the beam 104.

The telescoping movement sensing means 96 axially slides along the longitudinal axis 108 to maintain contact with the writing surface when insufficient force is applied to the longitudinal axis to indicate writing. The movement sensing means 96 has two orthogonally disposed transducer beams 110 extending to the forward end of the stylus element 90. Two pairs of transducer elements 112 are mounted to each side of the transducer beams. The orthogonal displacement resolves the forces actin on the movement sensor into two independent component forces.

In the embodiment of the invention illustrated in FIG. 3, the stylus element can be a felt marker element. For the embodiment having a felt marker stylus element the movement of the pen over the writing surface creates readable traces on contact with the surface. When the felt marker stylus is lifted from the writing surface, the spring 100 extends the movement sensing means 96 into position around the forward end of the stylus element 98. As the movement sensing means moves across the writing surface the transducer beams 110 deflect and the orthogonally disposed transducer elements 112 generate an image signal representative of the pattern traced on the writing surface. In this way, the position of the stylus is maintained without having the marker stylus element contacting the writing surface.

Figure 4:
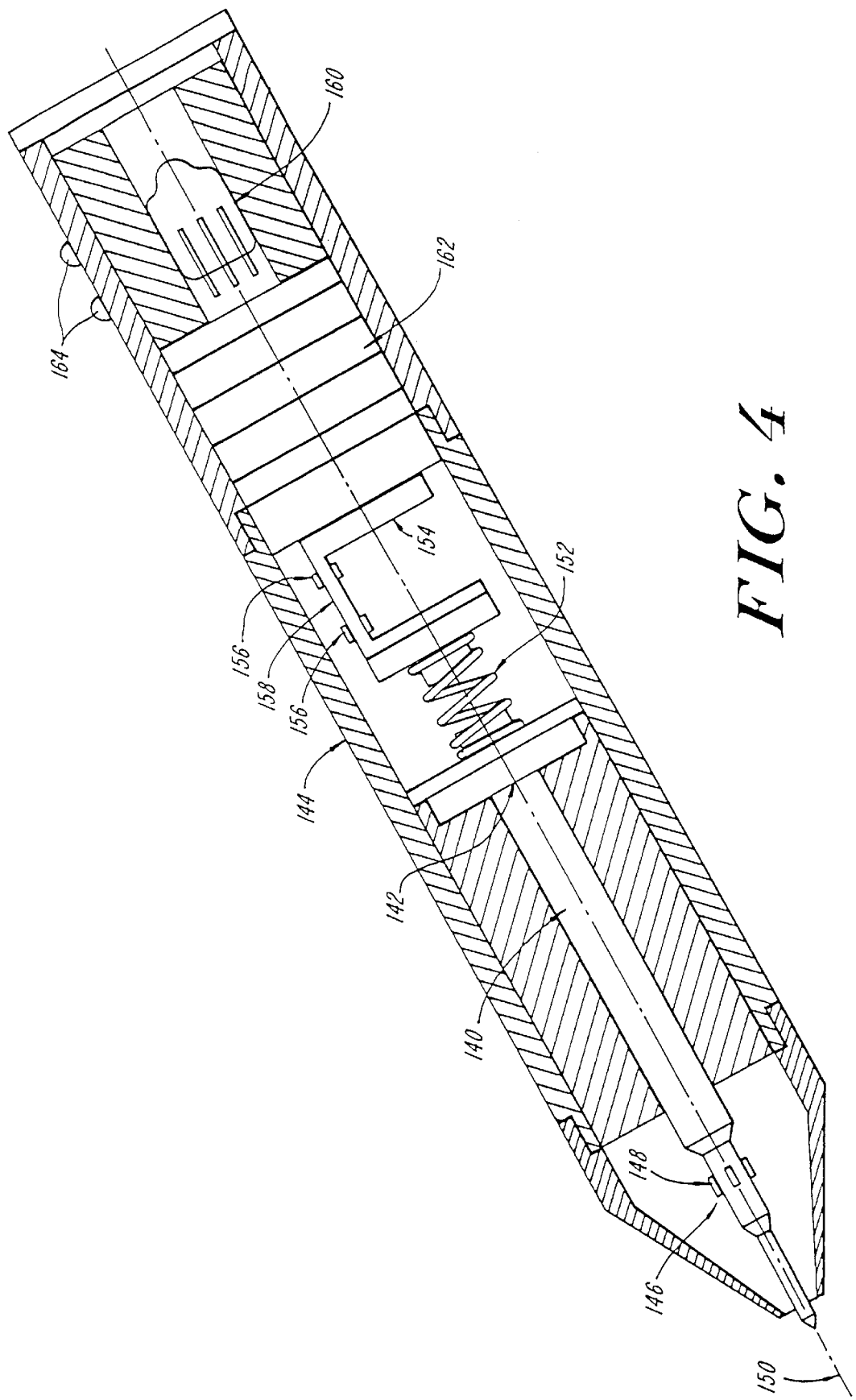
FIG. 4 is a schematic representation of an alternative embodiment of the present invention having transducers mounted to the stylus element.

FIG. 4 illustrates a third embodiment of the present invention. FIG. 4 depicts a stylus element 140 axially slid into seat 142. Seat 142 is axially slidable within housing 144. The movement sensing means 146 in FIG. 4 comprises transducer elements 148 mounted to the stylus element 140 and axially oriented along the longitudinal axis 150. Movement of the stylus across a writing surface distorts the stylus element 140 and the orthogonally displaced transducer elements 148 generate as image signals representative of the pattern traced.

Sufficient force along the longitudinal axis 150 compresses spring 152 and presses seat 142 against contact sensing means 154. As illustrated in FIG. 4 contact sensing means 154 has transducer elements 156 mounted on either side of transducer beam 158. As explained above distortions of the transducer beam are converted into image signals representative of the pattern traced on the writing surface. FIG. 4 further illustrates the tilt sensor element 160, the power supply 162 and the computer interface 164.

Figure 5:
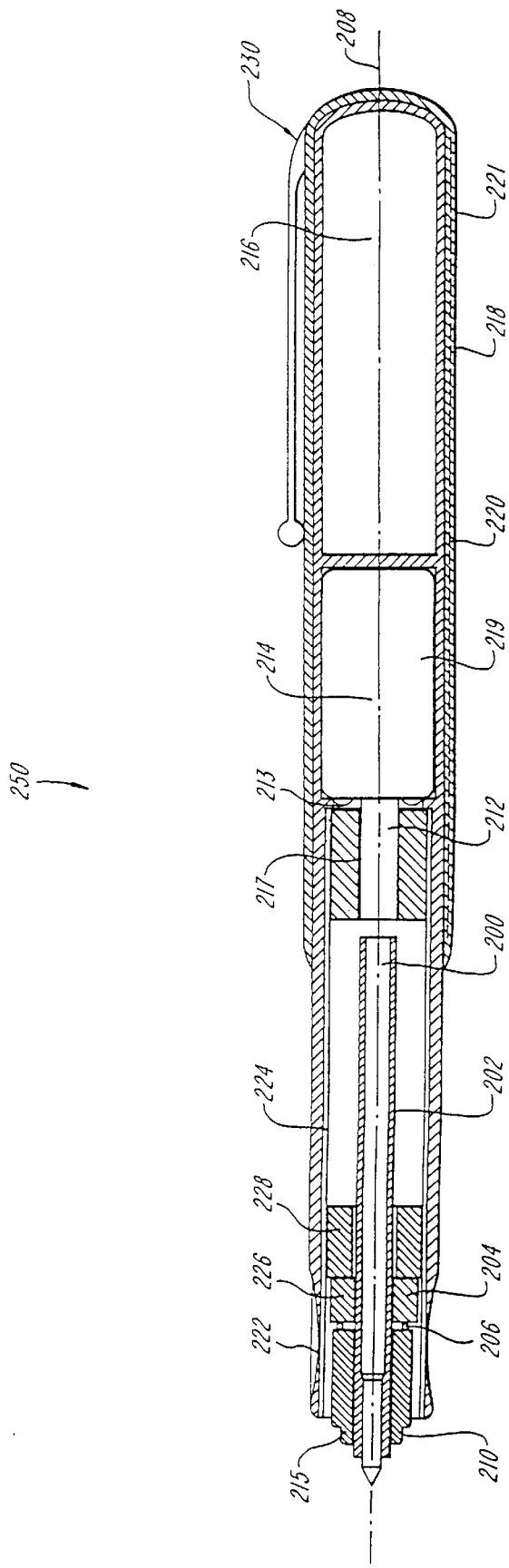
FIG. 5 is a schematic representation of a further alternative embodiment of the present invention having transducer mounted on the outer face of the sensor element.

FIG. 5 illustrates an alternative embodiment of the present invention. As depicted in FIG. 5, the device 250 has a stylus element 200 that is axially slid through an inertial mass 210, through a movement sensing means 204 and into a seat element 202. In the illustrated embodiment, the seat 202 is a hollow, metallic cylinder that connects to the inertial mass 210, and extends rearwardly through the sensing means 204. In one embodiment of the invention seat 202 is surrounded by a flexible circuit board. The flexible circuit board is etched to form power nets and signal nets that connect to the transducers 206 to contact points at the far rearward end of the seat 202. The movement sensing means of this embodiment has a forward portion 226 and a rearward portion 228 as depicted in FIG. 5. The rearward portion of sensing means 204 is fixed to the housing 224, and the forward portion 226 extends outward from the rearward portion 228, to form a moment arm that distorts in response to forces acting on the distal tip of stylus 200. In the preferred embodiment, the device 250 has a threaded positioning ferrule 215, that screws into the inertial mass 210, to rigidly fix the stylus 200 within the seat 202. Activation switches 222 are disposed at the forward end of the device 250. The switches are preferably disposed on a rotating collar which permits ready orientation as discussed further below.

As further depicted by FIG. 5, a tilt sensor 212 is positioned axially rearward of the seat 202 and connects, at its rearward end, to a power supply element 214. The power supply 214 is formed from a first forward cylinder 217, that is sized to axially slide into the tilt sensor 212 and from a rearward cylinder 219. In the illustrated embodiment, the rearward cylinder is shaped to receive conventional batteries. Tilt sensor 212 connects as its forwarded end to seat 202 and to the housing 224 so that the rearward portion of the tilt sensor 212 and the connected power supply 214 form a second moment arm. When the device 250 is held by the user, the power supply 214 acts as an inertial mass that distorts the tilt sensor 212, so that the gravitational forces acting on the power supply 214 cause the tilt sensor 212 to generate signals representative of the angles of orientation between the device's longitudinal axis 208 and the gravitational axis. Positioned axially rearward of the power supply 214, is the computer interface 216, that transmits the information generated by the sensing means 204 and the tilt sensor 212 as well as the information generated by the activation switches 222, to the computer unit 64.

As also illustrated by FIG. 5, the device 250 has an outer housing body 218 which can include an internal antenna 220 extending along the outer rearward portion of the housing body 218. The antenna 220 connects to the computer interface 216 to permit the transmission of radio-frequency signals. In an alternative embodiment, the outer housing body 218 is connected to a pen cap 230 which also has an antenna 221. The antenna 221 extends along the cap's outer surface, and couples to the antenna 220 when the pen cap 236 is connected to the housing 218.

Figure 6:
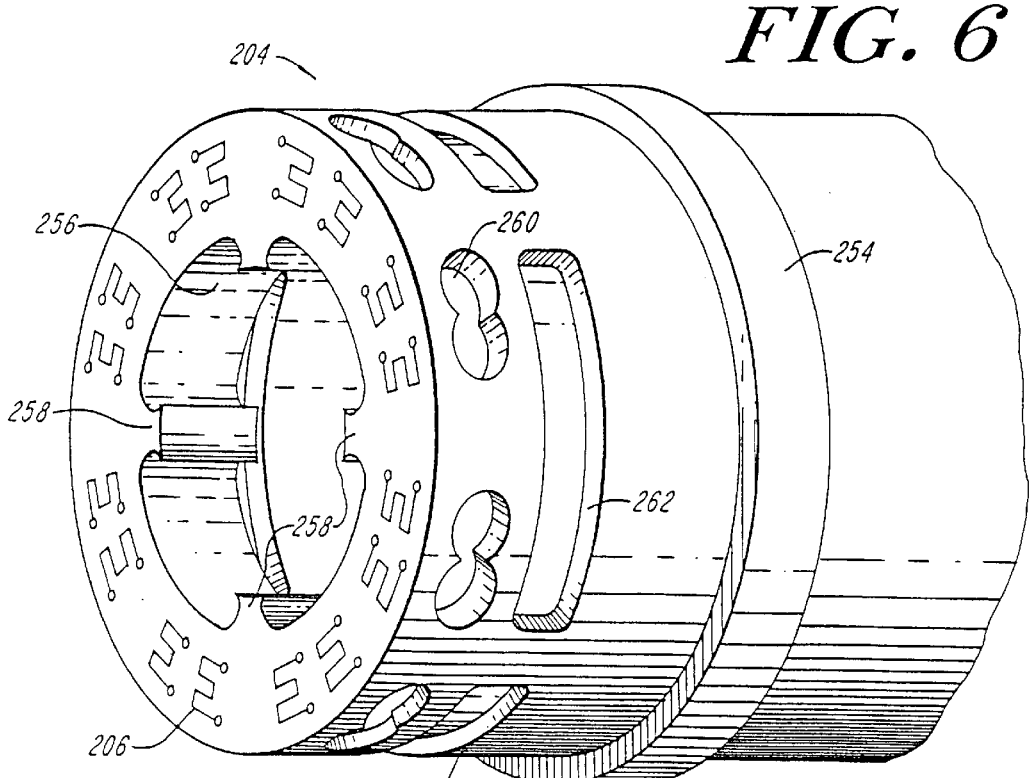
FIG. 6 is a schematic representation of the sensor element.

FIG. 6 illustrates in more detail the construction of the movement sensing means 204 and the tilt sensor 212. Both the sensing means 204 and the tilt sensor 212 can have the identical construction. For clarity, the following description is made with reference to the sensing means 204, although it also describes the tilt sensor 212. In the embodiment shown, eight pairs of transducer elements 206 are mounted along the outer face of the sensing means 204. Each pair of transducers 206 is mounted proximate to one of the eight figure-eight shaped slots 260 that extend through the sensing means 204. In one embodiment, the transducers 206 are separated from the widest portion of the figure-eight grooves, by a 3 mils thick wall. Each figure-eight shaped slot is positioned proximate to one of the four rectangular shaped grooves 26 that extend through the sensing means 204. In the preferred embodiment, the widest portion of the figure-eight slots 260 is separated for the grooves 262 by the same wall thickness that separates the transducers 206 from the figure-eight 260. As further illustrated by FIG. 6, there are four connection mounts 258, located along the inner surface 256 of sensor 204. The mounts 258 hold the cylindrical seat 202 within the sensing means, and further serve to transmit the forces applied to the stylus 200 to specific locations along the inner surface of the sensor 204. In the embodiment shown, the mounts 258 are positioned between two figure-eight slots 260. This configuration positions the transducers 206 at an optimal location for measuring the deformations of the sensing means 204. The illustrated sensor 294, also has a collar 254 that encircles the outer surface of the sensor 294, and is located rearward of the grooves 262. The collar 254 fixes the rearward portion of the sensor to the housing 224.

Figure 7:
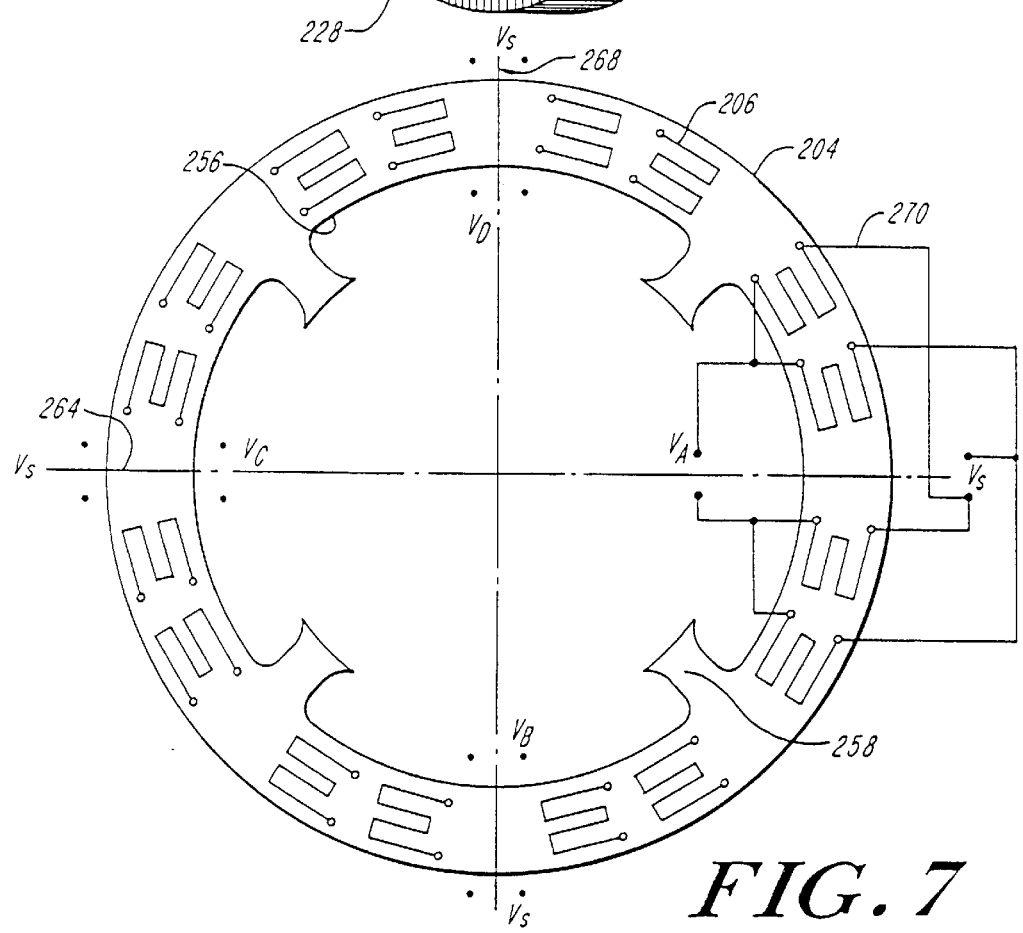
FIG. 7 is a schematic representative of the sensor that illustrates in more detail this location of the transducer elements.

FIG. 7 illustrates in more detail the location of the connection mounts 258 and of the transducers 206. As shown, each connection mount 258 is positioned radially across from a second connection mount 258, and between two pairs of transducer elements 206. With reference to FIGS. 6 and 7, it can be seen that between any two mounts 258, are two pairs of transducers 206 and two figure-eight shape slots 260. Forces applied to the stylus 200, are radially transmitted by the mounts 258, to a point on the inner surface 256 between two figure-eight slots. Each figure-eight slot 260 distorts and each pair of transducers 206 measures the distortion. As shown in FIG. 7, each pair of transducers 206 is also positioned radially across from a second pair of transducers 206. The transducers 206 are then spaced along the outer surface to divide the outer surface of the sensing means 204 along two orthogonal axes 264 and 268. As further illustrated by FIG. 7, each pair of transducers 206 is electrically coupled to a second pair of transducers 206, in order to form a sensing circuit 270 around the ends of the axes 264 and 268, and between two connection mounts 258 for clarity, only one of the four circuits 270 has been shown. Each circuit is constructed in a similar manner. In the embodiment shown, the circuit 270 is constructed as a Wheatstone bridge. Other circuit topologies, generally known in the art of strain sensor construction, such as half-Wheatstone bridges, can be readily substituted.

As is generally known in the art, the circuit 270 connected between two mounts 258, measures the forces that are applied to these mounts 258, and radially transmitted by mounts 258 to the inner surface 256. The circuit 270 measures the stresses caused by the deformation of the outer surface caused by the applied forces and determines component vector forces related to the axes 264 and 268. The stress measured is a function of the force applied to the mounts 258. The pattern of compression and tension of the strain gauges indicates the force applied along one of the axes 264 and 268. For example, the circuit 270, illustrated in FIG. 7, is located between two connection mounts 258. A force applied by the stylus 200, that acts on both these mounts 258 is measured by the circuit 270. If the force applied to the mount located in the upper half of the plane as defined by axes 264 and 268, is equal to the force applied to the mount 258 in the lower half of the plane, the circuit 270, measures a vector force directed along the 264 axis and having a magnitude:

$$F=(F^2x1+F^2Y2)^{0.5} \qquad (1)$$

As can be seen from the above example, the positioning of the transducers 206 along orthogonal axes 264 and 268 facilitates the reduction of sensed distortions into the vector component forces Fx and Fy.

A further feature of this construction is that forces applied along the longitudinal axis 208, to either the sensing means 204 or the tilt sensor 212, equally or substantially equally distort all the mounts 258. The force applied along the longitudinal axis 208, can be determined by measuring the equal force applied to all the mounts 258, particularly by subtracting the force applied to one mount 258 from the force applied to the mount located axially across from the first mount to obtain a measure of longitudinal force. Therefore, the sensor construction of this embodiment incorporates into one sensor element 294, a movement sensing means and a contact sensing means.

Figure 8A:
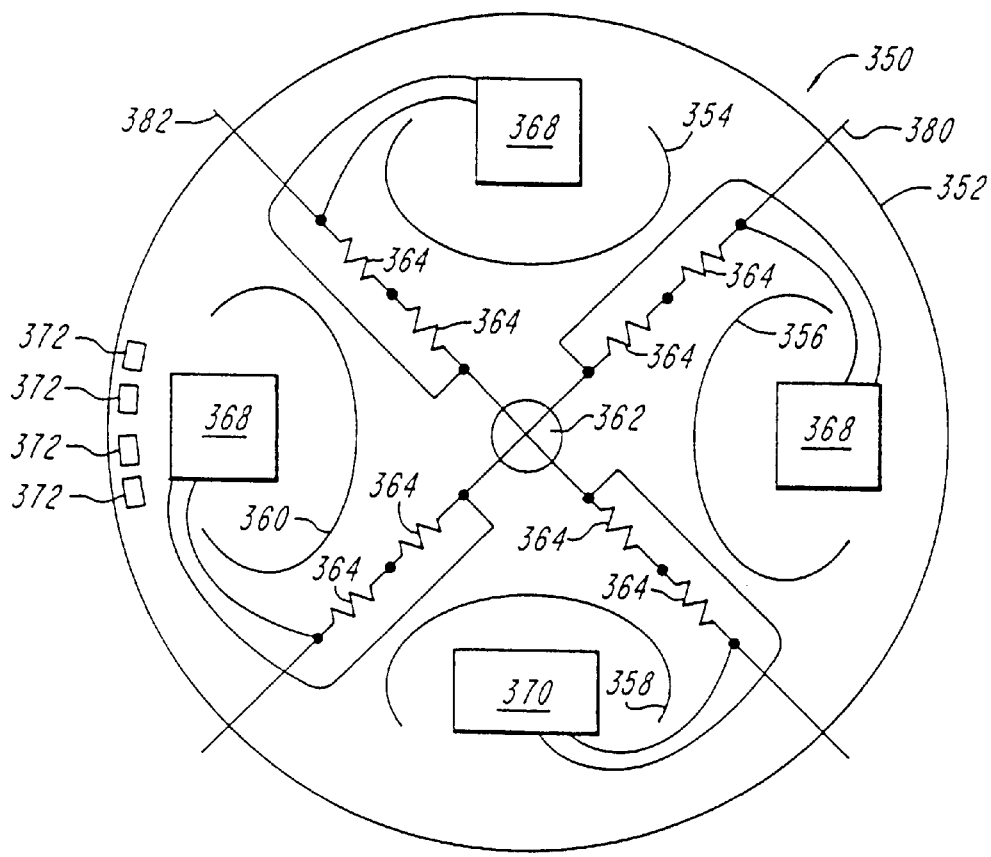
FIG. 8A and 8B are schematic representations of alternative sensors.
Figure 8B:
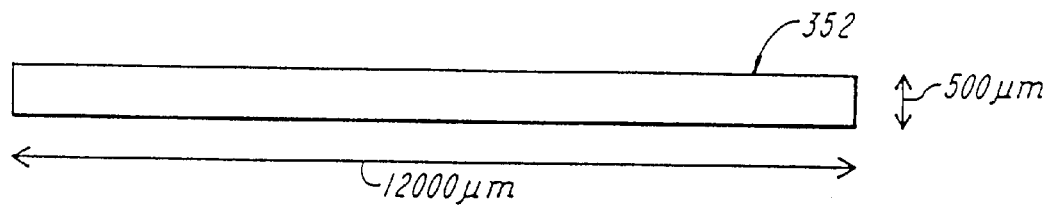

FIGS. 8A and 8B illustrate a further alternative sensor construction practicable with the invention. FIG. 8A depicts a sensor 350 that includes a substrate 352, cutouts 354, 356, 358 and 360, an optional center aperture 362, transducers 364, circuit elements 368, temperature compensation element 370, bonding pads 372, and transverse axes 380 and 382.

The sensor 350 depicted in FIGS. 8A and 8B is a semi-conductor device that provides in a unitary and easily manufactured package, a sensor that measures forces applied to the central portion of the sensor 350. As depicted by FIG. 8A, the sensor 350 is formed from a substrate 352 that has a plurality of cutouts that are evenly distributed about the interior periphery of the substrate 352. In the depicted embodiment of 8A, the cutouts 354–360 are depicted as curved apertures that extend completely through the substrate creating an opening that extends between an upper and a lower surface of the substrate 352. The apertures 354–360 allow the central portion of the substrate 352 to move responsive to an applied force. Accordingly, the central portion of the substrate 352 becomes a deflecting portion of the sensor 350. As further depicted by FIG. 8A, the deflecting portion of the substrate 352 connects to a peripheral portion of the substrate 352 by four arms that extend along the transverse axes 380 and 382. In the depicted embodiment, the arms of the sensor 350 are formed by the portions of the substrate 352 that extend between the periphery of the substrate 352 and the deflecting portion of the substrate 352 and which run between the cutouts 354–360. For example, FIG. 8A depicts one arm as the portion of the substrate 352 that extends from the periphery of the substrate 352 to the central deflecting portion, and that runs between the cutouts 354 and 360 and extend along the axis 382. In this depicted embodiment, the peripheral portion of the substrate 352 can be fixedly mounted, for example, to the housing of a pen, and the central deflecting portion is disposed free to deflect responsive to an applied force. The deflections can strain the arms that are fixedly mounted at the periphery of substrate 352, thereby providing strains and stresses that can be measured for generating signals representative of the force applied to the deflecting portion of the sensor 350. Accordingly, the sensor 350 provides an easily manufactured semi-conductor device suitable for acting as a sensor for measuring forces, such as the forces applied to the tip of stylus as it traces written information on a writing surface. As described above, the depicted sensor 350 can act as a movement sensing and contact sensing element, by measuring forces in three directors.

FIGS. 8A and 8B depict a substrate 352 that is formed of silicon and preferably is formed from a silicon wafer that has been processed to include bulk and thin film electronic devices. For example, the silicon wafer can be processed to include bulk devices such as resistors that can act as strain gauges for the sensor 350. Further, the substrate 352 can include cmos thin film electronic devices, such as operational amplifiers and diodes that form the Wheatstone bridge and amplifier circuitry, as described above, that configure the transductor elements as a circuit suitable for measuring applied forces. Similarly, the substrate 352 can include wiring that interconnects the electronic elements and that further connects the electronic elements to the depicted bonding pads 372 that can form contacts to exterior circuitry including, a power supply and an analog to digital converter board that can convert the force signals generated by the sensor 350 into digital signals.

FIG. 8A depicts cutouts 354–360 that are arced apertures that extend through the substrate 352. The depicted cutouts 354–360 provide apertures through the substrate 352 that disconnect the central portion of the substrate 352 from most of the peripheral portion of the substrate 352, leaving the central portion of the substrate 352 to be supported by four arms that extend relative to the axes 380 and 382. In this way, the cutouts 354–360 provide within the substrate 352 a deflecting portion and a plurality of arms that support the deflecting portion. The depicted cutouts 354–360 extend all the way through the substrate body 352. However, in alternative embodiments, the cutouts can extend partway through the substrate 352 and still provide a central deflecting portion supported by a plurality of arms. Moreover, the cutouts 354–360, in an alternative embodiment, can be large apertures that remove from the substrate 352 entire portions of the substrate body. FIG. 8A depicts a preferred embodiment of the invention that provides long thin apertures that extend all the way through the substrate body 352 and still provide sufficient surface area for the substrate 352 to carry electronic devices thereon. Moreover, the arced cutouts 354–360 isolate the electronic devices 368 and 370 from the distortions that effect the transducer elements 364, and which could effect the operation of the circuit elements 368 and 370. Although FIG. 8 depicts a preferred embodiment of the invention, it will be apparent to those of ordinary skill in the art of micro-machine manufacture that any cutout, or cutout geometry, that provides a deflecting portion for the sensor 350, can be practiced with the invention without departing from the scope thereof.

The depicted optional cutout 362 is a central aperture that provides a mechanical connection to a stylus element, or to a mechanical assembly that connects to a stylus element.

The depicted transducers 364 of FIG. 8A are shown as bulk resistors that act as strain gauges for measuring the strains occurring on each arm responsive to the deflection of the central deflecting portion of the substrate 352. In a preferred embodiment of the invention, the strain gauge transducers 364 are bulk resistors formed on the substrate 352 surface during a semi-conductor processing operation of the type commonly used for forming such resistors. Although the depicted transducer elements 364 are shown as strain gauges, it will be apparent to those of ordinary skill in the art that other transducer elements suitable for generating signals representative of the deflection of a central deflecting portion can be practiced with the present invention without departing from the scope thereof.

The circuit elements 368 depicted in FIG. 8A typically include wire elements that are preferably formed on the substrate 352 during a semi-conductor processing operation, and that are connected together the transducer elements 364, to form a full or half Wheatstone bridge, such as described above. More preferably, the circuit element 368 further includes operational amplifier circuitry for processing and amplifying the signals generated by the Wheatstone bridge to provide thereby signals representative of the forces applied to the deflecting portions of the sensor 350. The design and construction of such circuitry is well known in the art of electrical engineering and any circuitry suitable for processing and amplifying signals generated by a Wheatstone bridge can be practiced with the invention without departing from the scope thereof.

As further depicted in FIG. 8A, the circuit element 370 can be included, which includes a temperature compensation circuitry that compensates for the effects of temperature changes on the measurement of the applied forces. In particular, the temperature compensation circuitry 370 can compensate for thermal expansion that can occur as a result of the substrate 352, or transducers 364 rising in temperature. Preferably, the depicted circuitry 370 is formed of thin film and bulk devices formed on the substrate 352 during a semi-conductor manufacturing process. Typically, these devices include diodes which are temperature sensitive. Such a construction provides for improved performance and reduced variations and device characteristics. FIG. 8A further depicts a preferred embodiment of the sensor 350 that has a circular geometry which provides for a more uniform thermal expansion which is more readily compensated for by the circuitry 370 and which is less disruptive of the signals generated by the transducers 364.

Figure 9A:
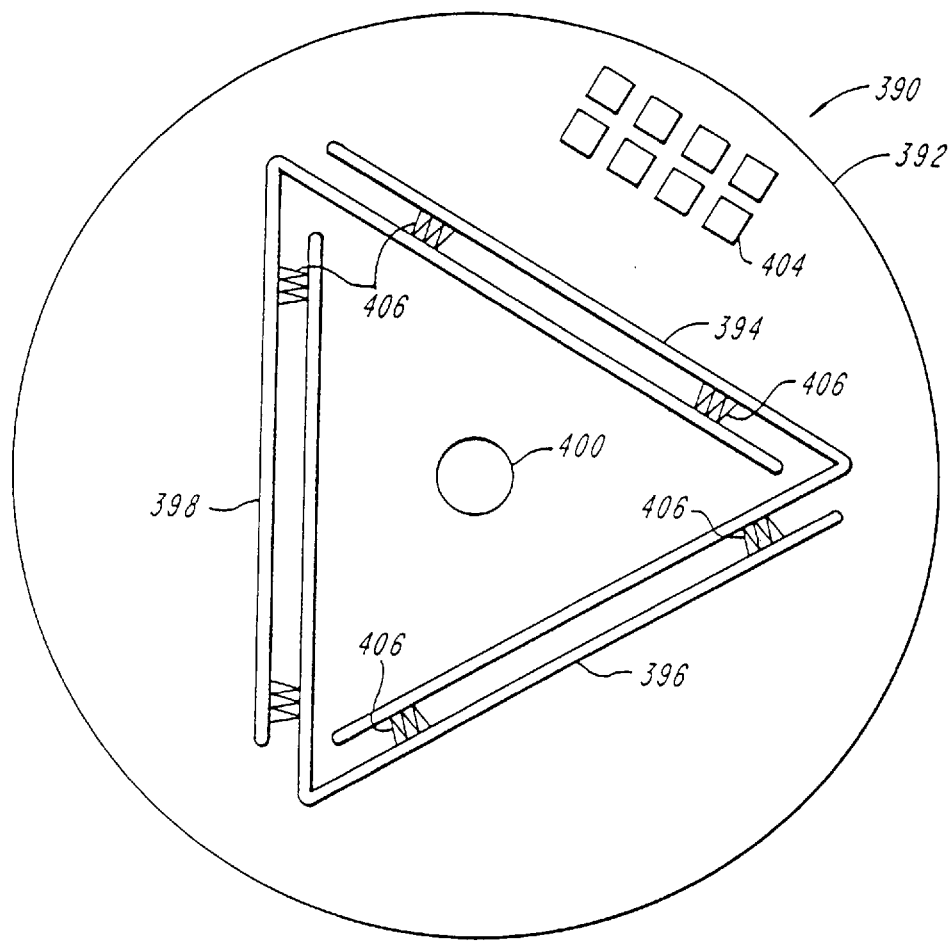
FIG. 9A and 9B are further alternative sensors.
Figure 9B:
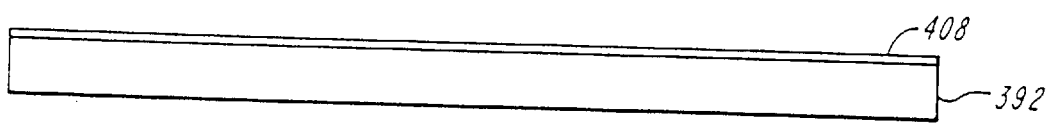

FIGS. 9A and 9B depict further alternative embodiments of the invention that include a sensor suitable for measuring forces applied to the tip of a stylus. FIG. 9A depicts a sensor 390 that has a substrate 392, cutouts 394, 396 and 398, a central aperture 400, contact points 404, and strain gauges 406. FIG. 9B depicts that the substrate 392, which can be a metallic material, such as steel, can also include a surface coating 408 which can be a ceramic material such as aluminum oxide ($AlO_2$).

FIG. 9A illustrates an alternative geometry for forming a deflecting portion within the surface of a substrate 392. In the depicted embodiment, a plurality of angular cutouts are formed as apertures extending through the body of the substrate 392. Three arms are formed that extend between the cutouts and that connect the central deflecting portion to the peripheral portion of the sensor 390. As depicted in FIG. 9A, the three arms have attached thereon transducer elements 406 which, as described above, can be strain gauge elements measuring the strain caused by deflections of the central deflecting portion of the sensor 390. In this embodiment, the forces measured by the three arms can be resolved into component forces acting relative to an orthogonal set of axes. In one practice, one side of one cutout is defined as running along the x-axis of a coordinate system. The other cutouts, which run transverse to the x-axis can be resolved into portions that run parallel to the x-axis and normal thereto. Accordingly, forces can be measured relative to an orthogonal pair of axes. Further, alternative systems can be used for measuring and resolving forces acting on the deflecting portion of the sensor 390. These systems are well known in the art of sensor design and any such systems suitable for measuring the forces acting on the deflection portion of the sensor 390 can be practiced with the present invention without departing from the scope thereof.

As depicted in FIG. 9B, the steel substrate 392 can include an aluminum oxide or other ceramic film surface 408. As depicted in FIG. 9A, contact pads 404 can be formed on the ceramic surface and wire elements can run between the transducers 406 and the contact pads 404 to interconnect the transducer elements with the contact pads 404. In one embodiment of the invention, the contact pads 404 form pin connections for connecting to a semi-conductor device that can be soldered, surface mounted, or otherwise attached to the contact pads 404. As will be readily recognized by one of ordinary skill in the art of electrical engineering, the semi-conductor device attached to the contact pads 404 can be a circuit for detecting strains measured by the transducers 406 and generating, responsive to the measured strains, signals representative of the forces acting on the deflecting portion of the sensor 390.

Figure 10:
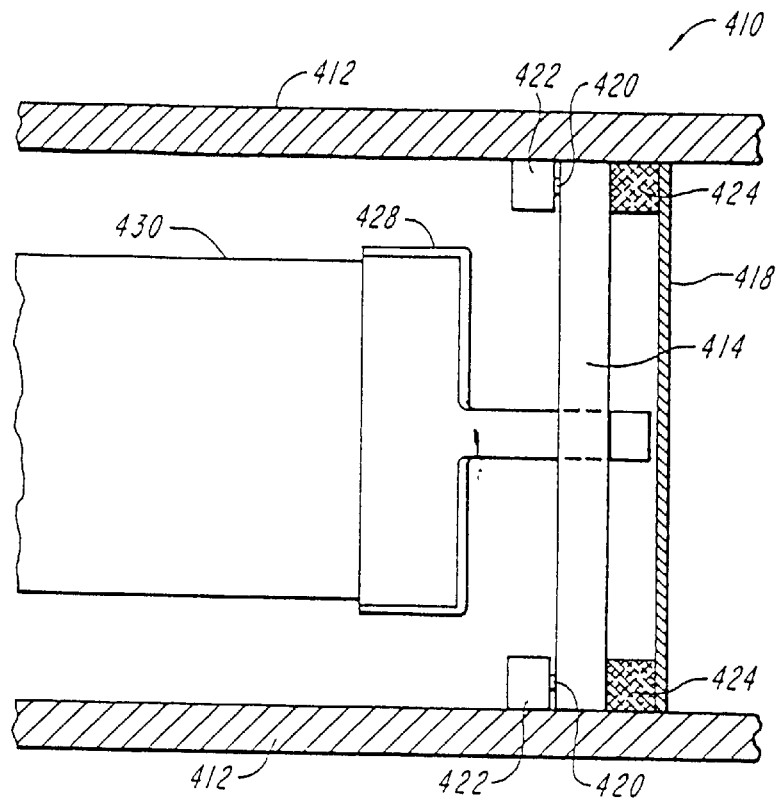
FIG. 10 schematically illustrates a stylus element mounted with a sensor as depicted in FIGS. 8A, 8B, 9A, and 9B.

FIG. 10 depicts a system 410 that includes a sensor 414 of the type depicted in FIGS. 8A, 8B, 9A, and 9B. In particular, FIG. 10 depicts a system 410 that includes a housing 412, a sensor 414, a support 418, a contact 420, support 422, support 424, container 428 and stylus 430.

As depicted in FIG. 10, the system 410 mounts the sensor 414 so that the peripheral portion of the sensor 414 is fixably mounted by supports 422 and 424 to the housing 412 of the system 410. Typically, the housing 412 can be the exterior portion of a pen device that is used for imaging written information. As further depicted in FIG. 10, the sensor 414 can have contact elements 420 that are electrically conductive contact elements for forming a circuit connection to a contact point provided on support 422. In this way, the sensor 414 can couple electrically through the contact 420 and support 422 to an external power supply, processing element, or other electronic circuitry.

As further depicted by FIG. 410, a container 428 extends through the central aperture of the sensor 414 and sits proximate a support wall 418. The support wall 418 is fixedly mounted against supports 424 and is selectably flexible. The support wall 418, therefore, acts as a mechanical stop and controls the amount and distance that the container 418 can distort the deflecting portion of the sensor 414. In one embodiment, support wall 418 is formed from a thin piece of aluminum.

As further depicted in FIG. 10, stylus element 430 which can be any commercially available pen stylus, or cartridge, is seated within the container 428 that extends through the deflecting portion of the sensor 414. As it will be understood by one of ordinary skill in the art, and from the above description, as the stylus element 430 traces across the writing surface, the forces applied to the tip of the stylus 430 act upon the sensor 413 which generates signals representative of these forces.

Figure 11:
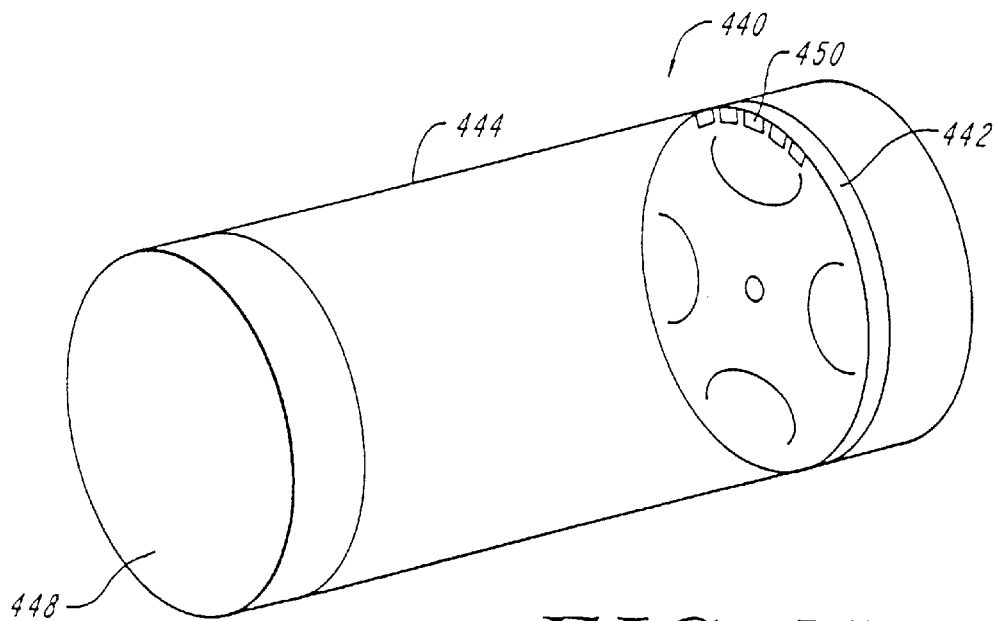
FIG. 11 schematically illustrates a sensor assembly for connecting into a pen housing.

FIG. 11 depicts a further alternative embodiment of the invention that includes a sensor such as those depicted in FIGS. 8A, 8B, 9A, and 9B. FIG. 11 depicts a system 440 that includes a sensor 442, a flexible circuit board assembly 444, a battery element 448, and contact pads 450. In the embodiment depicted in FIG. 11, the sensor element 442 electrically connects via the contact pads 450 to a flexible circuit board assembly 444 that is formed into a cylinder. The battery 448 is disposed within the cylindrical flexible circuit board assembly 444 and can provide power to the sensor 442 that, as depicted, is also formed into a circle. A stylus element, not shown, can extend into the cylindrical circuit at the end opposite the battery 448 and can contact, as described above, against the circuit 442 for distorting a central portion thereof. In this embodiment, the system 440 can be inserted into the circular housing of a pen device to thereby provide a sensor assembly that includes the sensor element 442 and a flexible circuit board 444 which is a circuit assembly for detecting and measuring forces sensed by the sensor 442. Accordingly, the system 440 provides a sensor assembly that can be inserted into the housing of a pen device to provide an instrument suitable for imaging written information.

The depicted sensors can be formed by a repeatable manufacturing process that provides sensors having semi-conductor features to provide thereby improved tolerance and uniform performance. In one process according to the invention, a silicon wafer is processed, according to conventional semi-conductor processing techniques, to form thereon a plurality of semi-conductor devices, each of which can include the electronic assemblies of a sensor, such as the sensor depicted in FIG. 8. In other words, semi-conductor processes can be employed to form the transducer elements, circuit elements, wiring patterns, and other such semi-conductor features. On a single silicon wafer, a plurality of such devices are formed. The process wafer is passed to a milling station that cuts the silicon wafer into a plurality of separate sensor devices.

In one embodiment, the milling station directs a laser beam at the silicon wafer and cuts from the wafer individual sensors that have a select geometry. For example, as depicted in FIG. 8A, the laser can cut each sensor to have a circular geometry, or any select geometry that is suitable for packaging the sensor within the housing of a pen device. For example, alternative geometrys, such as rectangles, ovals, hexagons, or any geometry can be achieved by milling the wafer. As mentioned above, the milling station can employ a laser beam to cut the sensor elements from the silicon wafer or, alternatively, can employ a focused ion beam device to cut the individual sensors from the silicon wafer.

In alternative processes, a metallic plate, such as steel, is coated with a ceramic material and semi-conductor processes are employed for forming on the ceramic coating a set of semi-conductor devices, such as bulk resistors, or other such thick film devices. As described above, the metallic plate can be milled, either mechanically or using the ablating techniques of a laser beam, ion beam, or other such ablating technique to cut individual sensor devices from the plate being milled.

The sensors depicted in FIGS. 8 and 9 can also provide semi-conductor devices suitable for measuring forces in three directions. As depicted in FIGS. 8 and 9, the semi-conductor sensors are illustrated as providing movement sensing elements and contact sensing elements. In an alternative embodiment, three of such sensors can be employed for providing a tilt sensor suitable for use of the present invention. In particular, with reference again to FIG. 8, three sensor elements, such as the depicted sensor element 350 can be orthogonally disposed to measure forces working along three orthogonal directions. Each sensor 350 is provided with a metallic core, preferably a soft metal core, within the central aperture 362. By providing an alternating current to the core, mechanical vibrations can be set up within the metallic core, much like a tuning fork. As is known in the art of accelerometers, the conservation of angular momentum provides that as the sensor 350 moves, the vibrating metal core will resist movement causing stresses and strains to be measured by the transducers 362. By measuring the stresses and the strains, the angle of the pen can be determined and measured independent of the action of the gravitational field. In a preferred embodiment of this accelerometer, as the forces generated by the metallic core are quite slight, the thickness of the substrate 352 is reduced by ablation. Preferably the rear surface of the sensor 350 is ablated to reduce the thickness of the substrate 352 to a thickness that provides for maximum sensitivity and yet yields sufficient robustness to prevent the sensor 350 from being easily damaged by the vibrating metallic core.

With reference again to FIG. 5, one operation of the device 250 for imaging information written on a surface can be explained. As generally stated earlier, forces acting on the distal tip of the stylus 200 during writing cause the sensing means 204 to distort. This distortion alters an electrical property of each transducer 206 in relation to the farces applied at the distal tip. In a similar manner, the force of gravity acting on the power supply 214, that is connected to the tilt sensor 212, causes the tilt sensor to distort, again altering electrical property of the transducers 213 in relation to the force applied. From the tilt information obtained from sensor 212 and the force information from sensor 294, the position of the stylus 200, relative to the writing surface, can be determined.

Figure 12:
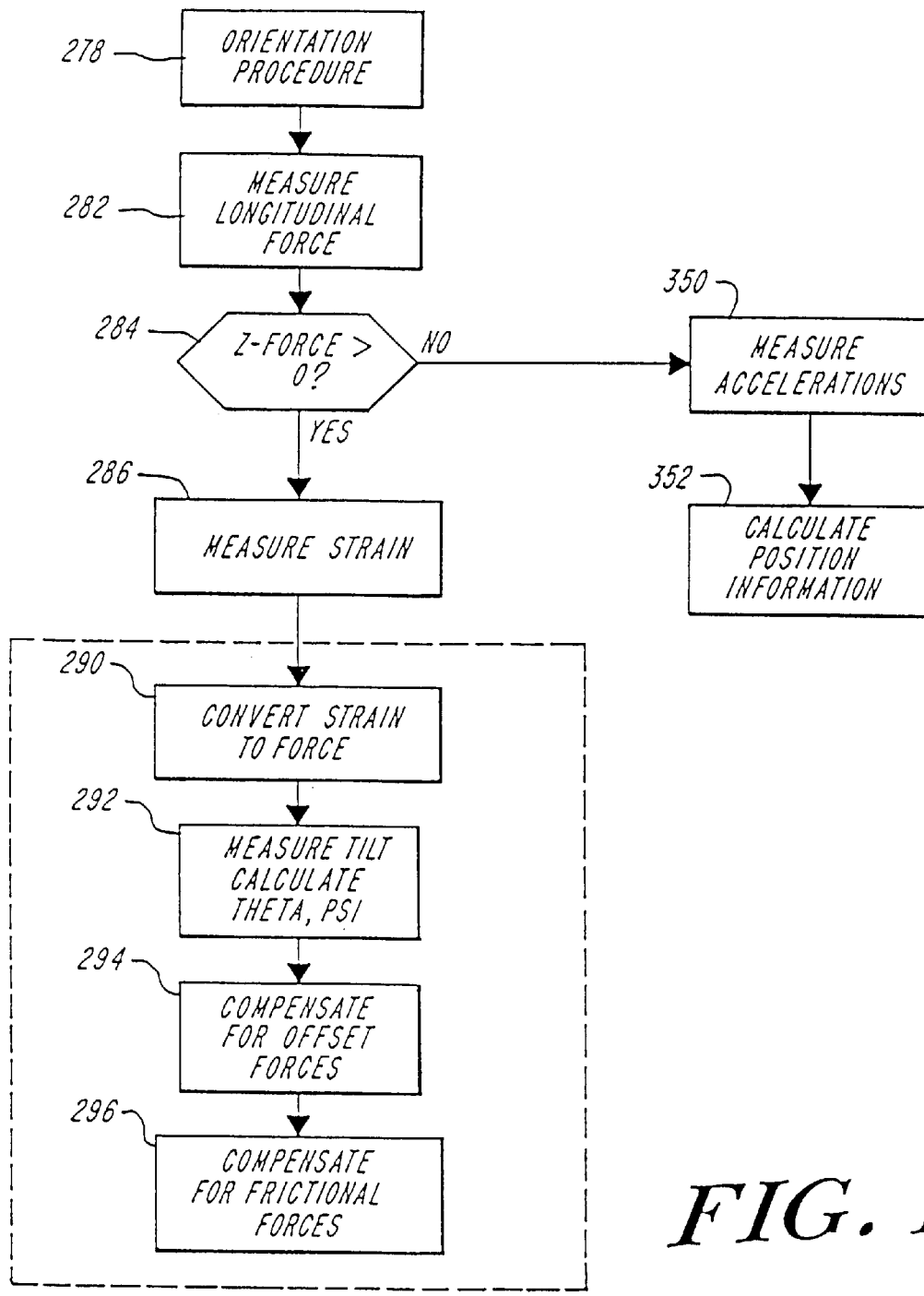
FIG. 12 is a flow chart representation that illustrates the steps for determining position information from force measurements.
Figure 13:
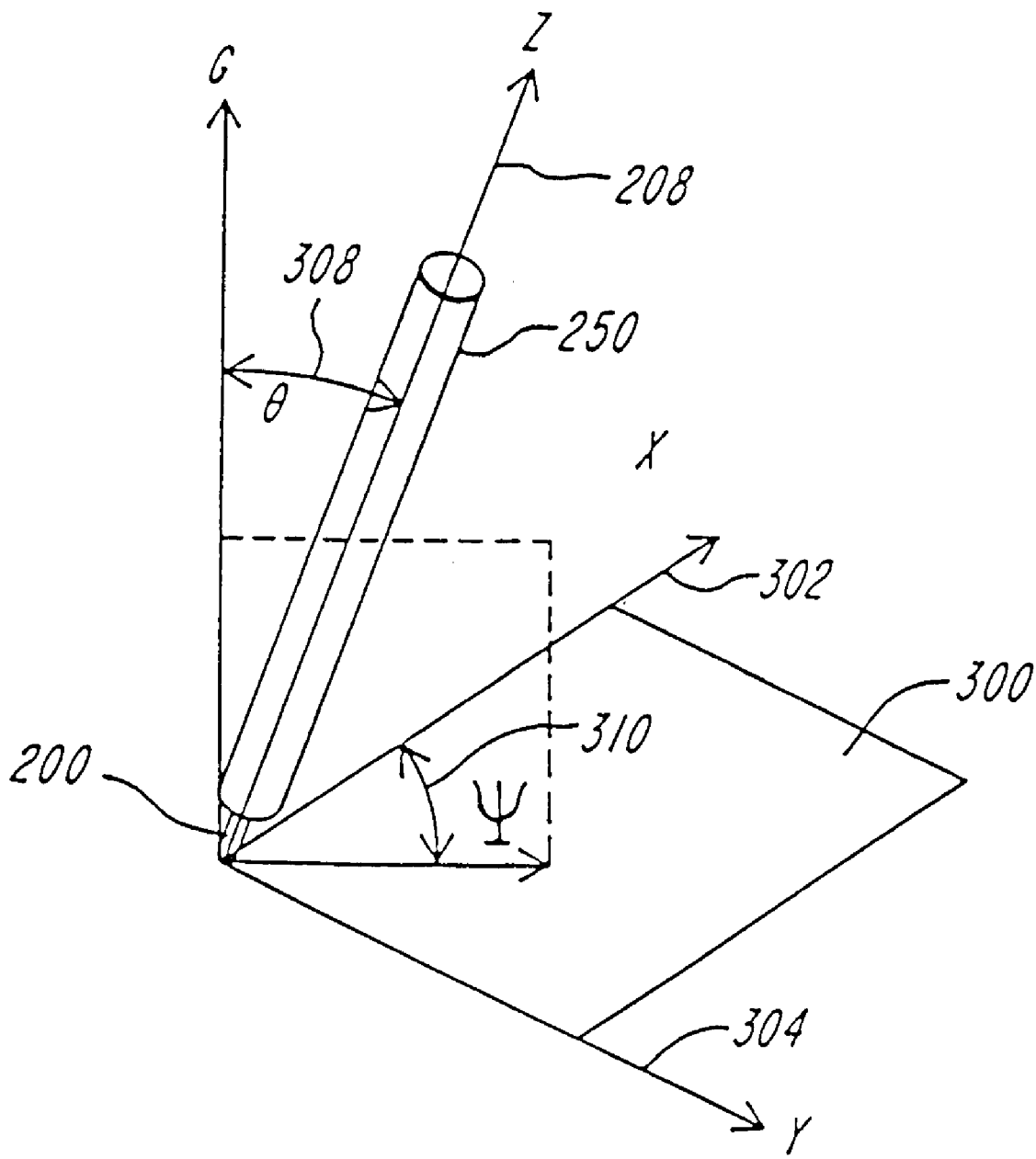
FIG. 13 is an illustration of the present invention as it is oriented relative to a writing surface.

FIG. 12 is a flowchart that illustrates, in more detail, the steps of one process for imaging written information. In step 280, the force along the longitudinal axis 208, Fz is measured in the manner described above. With reference to FIG. 13, it can be seen that when the user contacts the stylus 200 against a writing surface 300, a force defined as positive, is directed along the longitudinal axis 208. In step 282, the force applied along the longitudinal axis 208 is tested. If the longitudinal force is positive, the stylus 200 is defined as in contact with a writing surface 300. If the measured longitudinal force is zero or negative, the stylus 200 is described as being held above a writing surface 300. In this case, the longitudinal force being measured results from the inertial mass 210 pulling the sensor 204 in the direction defined as negative. In an alternative embodiment, the force could be tested against a user selected constant that relates to the viscosity of ink, carbon, or another marking material. As will be explained in greater detail hereinafter, for measured longitudinal forces that are less than or equal to zero, the inertial mass 210 and the sensing means 204 act as an accelerometer, being moved above a writing surface 300. For this case, the device 250 measures the forces generated by the inertial mass 210 being accelerated as the device is moved above writing surface 300. From these measured forces, the position of the distal tip of the stylus 200 as it moves above surface 300, can be determined relative to its previous position on the writing surface 300.

Initially, an orientation procedure step 278 can be implemented by twisting the button casing 222 about the longitudinal axis 208, to orient the reference system of the display, the reference system of the pen and the reference system of the writing surface relative to each other. This orientation procedure works because individuals within small ranges of deviation maintain a constant pen orientation angle during writing.

Once step 278 is complete, the absolute coordinate system is mapped onto the coordinate system of device 250 and forces representative of the written images are referenced to the absolute coordinate system. In step 286, the stylus 200 moves across the surface 300, and the sensing means 204 produces four voltage signals. Each voltage signal can be related to the strains applied by the stylus 200 to two pairs of transducers within one circuit 270. The tilt sensor 212 also produces four voltage signals. Each voltage signal can be related to the strains applied by the power supply 214 to one pair of transducers 213 within one of the four tilt sensor circuits 270. An analog to digital converter within the computer interface 216, converts each analog voltage signal into a series of numbers. In one embodiment, an eight-bit analog-to-digital converter is used to produce numbers between 0 and 255. In the preferred embodiment, these signals are transmitted to the processor 64, for calculating the position of the stylus 200 in terms of the absolute coordinate system.

In step 290, the measured strains are converted into measurements of forces and angles of orientation. A first conversion is performed on the four voltage signals that relates to the forces acting on the sensing means 204. In the embodiment illustrated in FIGS. 7, 8, and 9, each circuit 270 generates a voltage signal that is proportional to the strain applied to the transducers 206 connected within that circuit. In the embodiment illustrated, the transducers 206 are commercially available strain gauges that have a known relation to the applied stress. As is further known in the art, the applied stress relates to the applied force as a function of the area on which the force is applied. In one embodiment of the invention, a lookup table containing predetermined force values is used. The lookup table is indexed by stress measurements, so that each stress measurement can be immediately converted into a force measurement. Once four force measurements are determined, they are resolved into component forces relative to the axes 264 and 268 and the longitudinal axis 208. As described earlier, the location of the circuits 270 along the axes 264 and 268, facilitates the resolution of the measured forces into component forces.

In the step 292, similar techniques are used to calculate the orientation angles. As the gravitational force acts on the power supply 214, strain is applied to the transducers 213 within the tilt sensor 212. Using techniques discussed above, these strains can be converted into accelerations. In a second step, a known conversion constant is applied to the determined accelerations measurements to translate the measured accelerations into angles. The conversion constant can be determined experimentally for the selected transducer 213.

The orientation angles can be calculated to translate the component forces measured relative to the coordinate system of the device 250, into component force relative to the absolute coordinate system. With reference again to FIG. 9, it can be seen that the device 250 is held at an angle Θ 308 relative to the gravitational axis 306. It can further be see that the plane containing the gravitational axis 306 and the longitudinal axis 208, projects onto the x-y plane of a writing surface 300 to form an Angle Ψ 310 relative to the x-axis 302. The Angle 310 Ψ effectively measures the angle between the projection and the x-axis 302. When the device is held staticly, Ψ coincides with the writing angle. In typical operation, the weight of the device 250 and the writing pressure applied by the user, causes a force to be measured along the longitudinal axis 208. Even when the device 250 is held fixed against the surface 300, this force is present. As can be seen from FIG. 9, a force directed along the longitudinal axis 208, has a set of component forces that are directed along the axes 302 and 304. Ordinarily, forces directed along axes 302 and 304 indicate force applied to the distal tip of the stylus 200 as it moves along the surface. An electrolytic tilt sensor that measures a tilt signal along an x-axis and a y-axis can generate signals for determining the orientation angles. In one practice for measuring forces along the axes 302 and 304 that result from motion of the stylus 200 along the surface 300, a step 294 is provided that removes component forces that result from stylus contacting the surface at an angle.

The angle Θ 308 can be determined generally by the equation:

$$\tan \Theta = \text{SQRT} (Tx^2 + Ty^2). \quad (2)$$

The angle ψ 310 can be determined generally by the equation:

$$\sin \psi = Ty/\tan \Theta. \quad (3)$$

Equation 1a and 1b can be used in conjunction with the angles in the orientation procedure to determine the component forces in the various reference systems, including the device, absolute and writing system. Other processes for removing or resolving component forces can be practiced with the present invention without departing from the scope thereof Once the forces are measured and translated into the absolute coordinate system, the device 250 can also adjust the measured forces to compensate for frictional forces that act on the stylus 200. This can be accomplished in step 296. The frictional force that acts on the stylus is not always a constant value. The magnitude of the frictional force varies as the velocity of the stylus 200 varies. Therefore, to account for the frictional force that acts on the stylus 200, the model of the frictional forces is to include a static term and a velocity dependent term. Such an equation can be written generally as:

$$\gamma = u + kv \quad (4)$$

As can be seen from equation 4, the frictional force can be modeled as the summation of two components, a first component represented by a static coefficient of friction and a second velocity dependent component represented by the product of the coefficient of friction multiplied by the magnitude of the velocity of stylus 200.

In order to account for the velocity dependent term of equation 4, the force which drives the stylus 200 at a constant velocity is to be introduced. This force, called the driving force is given by:

$$F_G = \gamma F_z \quad (5)$$

As can be seen from equation 5, this driving force can be related to the static friction and the velocity dependent friction. Written more explicitly, the total frictional force can be represented generally by the equation:

$$\vec{\omega} = \vec{\omega}_s - kf_z \vec{v} \quad (6)$$

In equation 6, the total friction force is represented as a vector summation of a static friction component and a velocity dependent friction component that is related to the force applied along the longitudinal axis 208 of the device 250. The static friction component can be represented by one of two values depending on $F_z$.

$$\vec{\omega}_s = \begin{cases} -uf_z \dfrac{\vec{f}_G}{f_G} & uf_z < f_G \\ -\vec{f}_G & \end{cases} \quad (7)$$

Equation 7 gives the static friction component of equation 6 according to two functions depending on $F_z$, of the static coefficient of friction constant given in equation 4, the force applied along the longitudinal axis 208, and the force along the gravitational axis 306.

The force resulting from the static coefficient of friction can be accounted for by removing that force from the measured driving force. The resulting force is called the net force and is given generally by the equation:

$$f_n = f_G \times \begin{cases} 1 - uf_z/f_G & \\ 0 & uf_z < f_G \end{cases} \quad (8)$$

As can be seen from the equation 7, the net force can be arbitrarily set to zero depending on $F_z$ when the magnitude of the driving force is less than the magnitude of the force applied along the longitudinal axis multiplied by the static coefficient of friction.

The net force is then adjusted for the dynamic force by writing the net force as a linear ordinary differential equation, of first order and dependent on velocity. This equation is written as:

$$m \dfrac{d\vec{v}}{dt} = f_n - kf_z \vec{v} \quad (9)$$

This equation can be solved by a double numerical integration, integrating first to find velocity, and second to find position. In the preferred embodiment, equation 5 is solved by the Runge-Kutta method, which is an iterative technique for solving ordinary differential equations. Other generally known numerical techniques for solving differential equations could be used.

The schematic diagram of FIG. 5 illustrates a further feature of the present embodiment. FIG. 5 shows that forces can be applied to the distal tip of the stylus 200 in a second way. When the stylus 200 is lifted off the writing surface, the inertial mass 210, applies forces to the stylus 200 as the device 250 is moved above the writing surface. In this case, step 350, the longitudinal force acts in the opposite direction, indicating that the device is no longer in contact with a surface 300. In the same manner as above, the strains measured by the transducer 206 of the sensor 204, are converted into measurements of force relative to the absolute coordinate system. The processor device 64, not shown in FIG. 5, can apply the following illustrative equation to determine the position of the stylus 200 relative to the horizontal axis of the absolute coordinate system:

$$v_x = \int_o^t \frac{dv_x}{dt} dt + v_{x_o} \qquad (10)$$

$$x = \frac{1}{m} \int_o^t \int_o^t F_x dt\, dt + v_{x_o} t \qquad (11)$$

The force along the x-axis in equation 10 does not have to be compensated for the force of friction. Iterative numerical integration can be used to solve equations 10 and 11 for the position of the stylus 200 relative to the x-axis. To solve for the stylus 200 position relative to the y-axis, the equation 20 can be solved using the forces measured along the y-axis, Fy and the velocity along the y-axis, Vy.

In a further embodiment, two devices constructed in accordance with the present invention, can gather image information at distinct and remote locations. Both devices can be coupled to a processor unit 64 as shown in FIG. 2. Each processor unit processes the image signals according to a known algorithm and each processor has an electronic data link, such as a modem, to the other processor. In this way, a composite image is created from the image signals of the two devices, and each user can access the image from each processor unit.

In another aspect of the present invention, a method for imaging information that is traced on a writing surface is provided through the steps of distorting a stylus by moving it across a writing surface such as a piece of paper. In the next step, signals are generated related to the movement of the stylus across a surface, by measuring the distortions and deflections of the stylus as it move across the writing surface. In a similar step, signals are generated representative of the force of the stylus against the writing surface by measuring the distortion and compression of a sensor positioned between the stylus element and a fixed point. In this way, the forces resulting from disposing the stylus at an angle as it presses against the writing surface are removed from the measured forces along the horizontal and vertical axes of the stylus.

It should be understood that the above description pertains to but a few of the several electronic imaging system that embody the spirit and scope of the present invention. The description is intended as illustrative rather than limiting. The invention, therefore, is to be defined not by the preceding description but by the claims that follow

What is claimed is:

1. Apparatus for measuring an applied force, comprising a substrate having an upper surface, a lower surface and a peripheral portion, and a plurality of cutouts disposed between said upper and lower surfaces and spaced inwardly from said peripheral portion to form a deflecting portion disposed inwardly from said cutouts, and to form a plurality of arms that connect between said deflecting portion and said peripheral portion.

2. Apparatus according to claim 1 wherein said plurality of cutouts includes four cutouts and said plurality of arms includes four arms.

3. Apparatus according to claim 2 wherein said arms extend radially outward from said deflecting portion and along a set of transverse axes.

4. Apparatus according to claim 1 wherein said plurality of cutouts includes three cutouts and said plurality of arms includes three arms.

5. Apparatus according to claim 1 further comprising, transducers mounted to said plurality of arms to generate deflection signals representative of a deflection of said deflecting portion responsive to said applied force acting on said deflecting portion.

6. Apparatus according to claim 5, wherein said transducers include a strain gauge.

7. Apparatus according to claim 1 further comprising a circuit electrically connected to said transducers for generating, responsive to said deflection signal, a force signal representative of said applied force.

8. Apparatus according to claim 6, further comprising a temperature compensator for detecting a temperature characteristic and coupled to said circuit for directing said circuit to generate said force signal responsive to said temperature characteristic.

9. Apparatus according to claim 7, further comprising bonding pads disposed on said substrate and electrically coupled to said circuit.

10. Apparatus according to claim 9 wherein said bonding pads are disposed along said peripheral portion of said substrate.

11. Apparatus according to claim 1 wherein said substrate comprises a silicon substrate.

12. Apparatus according to claim 1 wherein said substrate comprises a metallic substrate.

13. Apparatus according to claim 12 further comprising an aluminum oxide coating disposed on one of said upper and lower surfaces.

14. Apparatus according to claim 1 wherein said substrate comprises a substantially circular substrate.

15. Apparatus according to claim 1 wherein said substrate further comprises a centrally located aperture.

16. Apparatus for imaging writing, comprising a stylus, a sensor that couples to said stylus and includes a plurality of cutouts for forming a deflecting portion, and a plurality of arms, transducers mounted to said plurality of arms for generating deflection signals representative of a deflecting motion of said deflecting portion, and a circuit for generating responsive to said deflection signals, force signals representative of a force acting of said stylus.

* * * * *